United States Patent
Shrestha et al.

(10) Patent No.: US 12,185,132 B2
(45) Date of Patent: Dec. 31, 2024

(54) CONFIGURATION AND REPORTING OF LOCATION INFORMATION IN CONJUNCTION WITH MDT

(71) Applicant: Telefonaktiebolaget LM Ericsson (publ), Stockholm (SE)

(72) Inventors: Deep Shrestha, Linköping (SE); Fredrik Gunnarsson, Linköping (SE); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/769,015

(22) PCT Filed: Sep. 24, 2020

(86) PCT No.: PCT/SE2020/050899
§ 371 (c)(1),
(2) Date: Apr. 14, 2022

(87) PCT Pub. No.: WO2021/076027
PCT Pub. Date: Apr. 22, 2021

(65) Prior Publication Data
US 2024/0107335 A1    Mar. 28, 2024

Related U.S. Application Data

(60) Provisional application No. 62/915,218, filed on Oct. 15, 2019.

(51) Int. Cl.
*H04W 4/00*    (2018.01)
*H04L 43/06*   (2022.01)
(Continued)

(52) U.S. Cl.
CPC .............. *H04W 24/02* (2013.01); *H04L 43/06* (2013.01); *H04W 8/22* (2013.01)

(58) Field of Classification Search
CPC ........ H04W 24/02; H04W 8/22; H04L 43/06; H04L 12/18
See application file for complete search history.

(56) References Cited

U.S. PATENT DOCUMENTS

| 11,632,652 B2 * | 4/2023 | Modarres Razavi . H04W 64/00 455/456.1 |
| 2010/0232362 A1 * | 9/2010 | Tenny ................... H04W 48/10 370/328 |

(Continued)

FOREIGN PATENT DOCUMENTS

WO    2013107386 A1    7/2013

OTHER PUBLICATIONS

3GPP, "3GPP TS 33.210 V16.2.0", 3rd Generation Partnership Project; Technical Specification Group Services and System Aspects; 3G security; Network Domain Security (NDS); IP network layer security (Release 16), Jun. 2019, 1-28.

(Continued)

*Primary Examiner* — Abdelnabi O Musa
(74) *Attorney, Agent, or Firm* — Murphy, Bilak & Homiller, PLLC

(57) ABSTRACT

A method of operating a wireless communication device of a radio communication network includes obtaining information identifying at least one of: 1) how often the wireless communication device requests assistance data be provided by a network node of the radio communication network for positioning by the wireless communication device; and 2) how often the wireless communication device performs positioning. The method can further include sending a request for assistance data containing the information toward the network node. Another method of operating a (Continued)

serving node that communicates with wireless communication devices and a network node of a radio communication network, includes requesting the network node to provide assistance information that identifies wireless communication devices that are configured to use assistance data from the network node for positioning and/or identifies wireless communication devices that have requested assistance data from the network node for positioning.

20 Claims, 15 Drawing Sheets

(51) Int. Cl.
*H04W 8/22* (2009.01)
*H04W 24/02* (2009.01)

(56) References Cited

U.S. PATENT DOCUMENTS

| | | | | |
|---|---|---|---|---|
| 2012/0184302 | A1* | 7/2012 | Kazmi | H04W 64/00 |
| | | | | 455/456.6 |
| 2013/0114446 | A1 | 5/2013 | Liu et al. | |
| 2013/0190009 | A1* | 7/2013 | Johansson | H04W 4/029 |
| | | | | 455/456.1 |
| 2013/0223626 | A1* | 8/2013 | Edge | H04W 12/10 |
| | | | | 455/411 |
| 2014/0113608 | A1* | 4/2014 | Wirola | G01S 5/0045 |
| | | | | 455/418 |
| 2015/0201305 | A1* | 7/2015 | Edge | H04W 84/045 |
| | | | | 455/456.3 |
| 2018/0132061 | A1* | 5/2018 | Bitra | G01S 5/10 |
| 2018/0324740 | A1* | 11/2018 | Edge | H04W 64/00 |
| 2019/0230477 | A1* | 7/2019 | Yu | G01S 5/0236 |
| 2019/0253996 | A1* | 8/2019 | Kelley | H04W 4/06 |
| 2022/0179097 | A1* | 6/2022 | Gunnarsson | G01S 19/252 |
| 2022/0196780 | A1* | 6/2022 | Dwivedi | H04W 8/12 |
| 2022/0408398 | A1* | 12/2022 | Shreevastav | G01S 5/0236 |
| 2023/0164512 | A1* | 5/2023 | Gunnarsson | H04W 4/50 |
| | | | | 455/456.1 |

OTHER PUBLICATIONS

3GPP, "3GPP TS 36.305 V15.0.0", 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 15), Jul. 2018, 1-85.

3GPP, "3GPP TS 36.413 V15.7.0", 3rd Generation Partnership Project; Technical Specification Group Radio Access Network; Evolved Universal Terrestrial Radio Access Network (E-UTRAN); S1 Application Protocol (S1AP) (Release 15), Sep. 2019, 1-392.

3GPP, "3GPP TS 38.413 V15.5.0", 3rd Generation Partnership Project; Technical Specification Group Radio Access Network; NG-RAN; NG Application Protocol (NGAP) (Release 15), Sep. 2019, 1-329.

3GPP, "3rd Generation Partnership Project; Technical Specification Group Radio Access Network; Study on Minimization of drive-tests in Next Generation Networks; (Release 9)", 3GPP TR 36.805 V9.0.0, Dec. 2009, 1-24.

Intel Corporation, "Positioning Enhancements for MDT", 3GPP TSG RAN WG2 Meeting #75bis, R2-115387, Zhuhai, China, Oct. 10-14, 2011, 1-3.

* cited by examiner

CONFIGURATION AND REPORTING OF LOCATION INFORMATION IN CONJUNCTION WITH MDT

FIELD

The present disclosure relates generally to wireless communications networks and, more particularly, positioning of wireless communication terminals.

BACKGROUND

Minimizing Drive Test (MDT) was firstly studied in Rel-9 (TR 36.805) driven by RAN2 with the purpose to minimize the actual drive tests. MDT has been introduced since Rel-10 in Long Term Evolution (LTE). MDT has not been specified for New Radio (NR) in the involved standards in RAN2, RAN3 and SA5 groups.

The use cases in the TR 36.805 include:
Coverage optimization
Mobility optimization
Capacity optimization
Parameterization for common channels
QoS verification Access and Mobility management Function (AMF) includes Radio Resource Control (RRC) Inactive Transition Report Request IE in a message from AMF to NG-RAN node to request NG-RAN node to report the RRC state and user location information of a specific UE when the UE enters or leaves RRC_INACTIVE. NG-RAN node which receives the RRC Inactive Transition Report Request IE sends the RRC Inactive Transition Report message for the specific UE to the AMF.

The following IE indicates the RRC state of the UE.

| IE/Group Name | Presence | Range | IE type and reference | Semantics description |
|---|---|---|---|---|
| RRC State | M | | ENUMERATED (Inactive, Connected, . . .) | Indicates the current RRC state of the UE. |

1.1 Trace Start

This message is sent by the AMF to initiate a trace session for a UE. Direction: AMF→NG-RAN node

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| AMF UE NGAP ID | M | | 9.3.3.1 | | YES | reject |
| RAN UE NGAP ID | M | | 9.3.3.2 | | YES | reject |
| Trace Activation | M | | 9.3.1.14 | | YES | ignore |

1.2 Trace Failure Indication

The purpose of the Trace Failure Indication procedure is to allow the NG-RAN node to inform the AMF that a Trace Start procedure or a Deactivate Trace procedure has failed due to an interaction with a handover procedure.

The NG-RAN node initiates the procedure by sending a TRACE FAILURE INDICATION message. Upon reception of the TRACE FAILURE INDICATION message, the AMF shall take appropriate actions based on the failure reason indicated by the Cause IE.

The message includes the following IEs:
Message Type
AMF UE NGAP ID
RAN UE NGAP ID
NG-RAN Trace ID
Cause

1.3 Trace Activation IE in TS 36.413

Defines parameters related to a trace activation.

| IE/Group Name | IE type and reference | Semantics description |
|---|---|---|
| E-UTRAN Trace ID | OCTET STRING (SIZE(8)) | The E-UTRAN Trace ID IE is composed of the following: Trace Reference defined in TS 32.422 [10] (leftmost 6 octets, with PLMN information coded as in 9.2.3.8), and Trace Recording Session Reference defined in TS 32.422 [10] (last 2 octets). |
| Interfaces To Trace | BIT STRING (SIZE(8)) | Each position in the bitmap represents an eNB or en-gNB interface: first bit = S1-MME, second bit = X2, third bit = Uu, fourth bit = F1-C, fifth bit = E1: other bits reserved for future use. Value '1' indicates 'should be traced'. Value '0' indicates 'should not be traced'. |
| Trace depth | ENUMERATED(minimum, medium, maximum, MinimumWithoutVendorSpecificExtension, Medium WithoutVendorSpecificExtension, MaximumWithoutVendorSpecificExtension, . . .) | Defined in TS 32.422 [10]. |

-continued

| IE/Group Name | IE type and reference | Semantics description |
|---|---|---|
| Trace Collection Entity IP Address | Transport Layer Address 9.2.2.1 | Defined in TS 32.422 [10]. |
| MDT Configuration | 9.2.1.81 | |
| UE Application layer measurement configuration | 9.2.1.128 | |

1.4 Trace Activation IE in TS 38.413

The following IE defines parameters related to a trace session activation.

| IE/Group Name | Presence | Range | IE type and reference | Semantics description |
|---|---|---|---|---|
| NG-RAN Trace ID | M | | OCTET STRING (SIZE(8)) | This IE is composed of the following: Trace Reference defined in TS 32.422 [11] (leftmost 6 octets, with PLMN information encoded as in 9.3.3.1), and Trace Recording Session Reference defined in TS 32.422 [11] (last 2 octets). |
| Interfaces to Trace | M | | BIT STRING (SIZE(8)) | Each position in the bitmap represents an NG-RAN node interface: first bit = NG-C, second bit = Xn-C, third bit = Uu, fourth bit = F1-C, fifth bit = E1: other bits reserved for future use. Value '1' indicates 'should be traced'. Value '0' indicates 'should not be traced' |
| Trace Depth | M | | ENUMERATED (minimum, medium, maximum, minimum WithoutVendorSpecificExtension, medium WithoutVendorSpecificExtension, maximum WithoutVendorSpecificExtension, . . .) | Defined in TS 32.422 [11]. |
| Trace Collection Entity IP Address | M | | Transport Layer Address 9.3.2.4 | Defined in TS 32.422 [11] |

1.5 MDT Types Based on RRC States

In general, there are two types of MDT measurement logging, i.e., Logged MDT and Immediate MDT.

1.6 Logged MDT

A UE in RRC IDLE state is configured to perform periodical MDT logging after receiving the MDT configurations from the network. The UE shall report the DL pilot strength measurements (RSRP/RSRQ) together with time information, detailed location information if available, and WLAN, Bluetooth to the network via using the UE information framework when it is in RRC_CONNECTED state. The DL pilot strength measurement of Logged MDT is collected based on the existing measurements required for cell reselection purpose, without imposing UE to perform additional measurements.

TABLE 1

The measurement logging for Logged MDT

| MDT mode | RRC states | Measurement quantities |
|---|---|---|
| Logged MDT | RRC_IDLE | RSRP and RSRQ of the serving cell and available UE measurements for intra-frequency/inter-frequency/inter-RAT, time stamp and detailed location information if available. |

For Logged MDT, UE receives the MDT configurations including logging interval and logging duration in the RRC message, i.e., LoggedMeasurementConfiguration, from the network. A timer (T330) is started at the UE upon receiving the configurations and set to loggingduration (10 min-120 min). The UE shall perform periodical MDT logging with the interval set to logginginterval (1.28 s-61.44 s) when the UE is in RRC IDLE. An example of the MDT logging is shown in the FIG. 1. FIG. 1 illustrates an example logged MDT procedure.

1.7 Immediate MDT

Measurements for Immediate MDT purpose can be performed by RAN and UE. There are a number of measurements (M1-M9) which are specified for RAN measurements and UE measurements. For UE measurements, the MDT configuration is based on the existing RRC measurement procedures for configuration and reporting with some extensions for location information.

The measurement quantities for Immediate MDT are shown in Table 2 below.

TABLE 2

The measurement quantities for Immediate MDT

| MDT mode | RRC states | Measurement quantities |
|---|---|---|
| Immediate MDT | RRC_CONNECTED | M1: RSRP and RSRQ measurement by UE. M2: Power Headroom measurement by UE. M3: Received Interference Power measurement by eNB. M4: Data Volume measurement separately for DL and UL, per QCI per UE, by eNB. M5: Scheduled IP Throughput for MDT measurement separately for DL and UL, per RAB per UE and per UE for the DL, per UE for the UL, by eNB. M6: Packet Delay measurement, separately for DL and UL, per QCI per UE, see UL PDCP Delay, by the UE, and Packet Delay in the DL per QCI, by the eNB. M7: Packet Loss rate measurement, separately for DL and UL per QCI per UE, by the eNB. M8: RSSI measurement by UE. M9: RTT measurement by UE. |

The reporting of the Immediate MDT is specified as follows.

For M1:
  Event-triggered measurement reports according to existing RRM configuration for events A1, A2, A3, A4, A5 A6, B1 or B2.
  Periodic, A2 event-triggered, or A2 event triggered periodic measurement report according to MDT specific measurement configuration.

For M2: Reception of Power Headroom Report (PER) according to existing RRM configuration.

For M3-M9: End of measurement collection period.

1.8 Management Reporting Measurements

As part of the UE information request/reporting framework, the UE can provide previously configured information associated to specific events:
  Radio Link Failure
  RACH report
  Connection Establishment Failure
  Or similar In combination with these reports the wireless communication device can be asked to provide location information. Typically, these are snapshot events, meaning that only the location information associated to the event is reported. However, there are also other events possible, where it can be relevant to log measurement prior to the event or after the event as well.

1.9 Overall Architecture for Separation of gNB-CU-CP and gNB-CU-UP

The overall architecture for separation of gNB-CU-CP and gNB-CU-UP is depicted in FIG. 2. Elements of the architecture of FIG. 2 include:
  A gNB may be a gNB-CU-CP, multiple gNB-CU-UPs and multiple gNB-DUs;
  The gNB-CU-CP is connected to the gNB-DU through the F1-C interface;
  The gNB-CU-UP is connected to the gNB-DU through the F1-U interface;
  The gNB-CU-UP is connected to the gNB-CU-CP through the E1 interface;
  One gNB-DU is connected to only one gNB-CU-CP;
  One gNB-CU-UP is connected to only one gNB-CU-CP,
  It is noted that for resiliency, a gNB-DU and/or a gNB-CU-UP may be connected to multiple gNB-CU-CPs by appropriate implementation;
  One gNB-DU can be connected to multiple gNB-CU-UPs under the control of the same gNB-CU-CP; and
  One gNB-CU-UP can be connected to multiple DUs under the control of the same gNB-CU-CP.

It is also noted that connectivity between a gNB-CU-UP and a gNB-DU is established by the gNB-CU-CP using Bearer Context Management functions. It is further noted that gNB-CU-CP selects the appropriate gNB-CU-UP(s) for the requested services for the UE. In case of multiple CU-UPs they belong to same security domain as defined in TS 33.210 [18]. It is further noted that data forwarding between gNB-CU-UPs during intra-gNB-CU-CP handover within a gNB may be supported by Xn-U.

1.10 Positioning Methods and UE Based Positioning

Positioning has been a topic in LTE standardization since 3GPP Release 9. The main initial objective with positioning was to fulfill regulatory requirements for emergency call positioning. However, positioning brings benefits to many other use cases as well.

Positioning in NR is proposed to be supported by the architecture shown in FIG. 3. Location Management Function (LMF) is the location server in NR. There are also interactions between the location server and the gNB via the NRPPa protocol. The interactions between the gNB and the wireless communication device is supported via the RRC protocol. Regarding FIG. 3 it is noted that the gNB and ng-eNB may not always both be present. It is further noted that when both the gNB and ng-eNB are present, the NG-C interface is only present for one of them.

The standard positioning methods supported for E-UTRAN access are:

network-assisted GNSS methods;

downlink positioning;

enhanced cell ID method;

uplink positioning;

WLAN method;

Bluetooth method;

Terrestrial Beacon System (TBS) method; and

Sensor based methods:

Barometric Pressure Sensor, and

Motion sensor.

Among the listed positioning methods, a hybrid positioning can be done by combining two or more than two methods is also supported. In addition, standalone mode (e.g. autonomous, without network assistance) using one or more methods from the list of positioning methods above is also supported.

These positioning methods may be supported in UE-based, UE-assisted/E-SMLC-based, eNB-assisted, and LMU-assisted/E-SMLC-based versions. Table 2 indicates which of these versions are supported in this version of the specification for the standardized positioning methods.

TABLE 2

Supported versions of UE positioning methods

| Method | UE-based | UE-assisted, E-SMLC-based | eNB-assisted | LMU-assisted/E-SMLC-based | SUPL |
|---|---|---|---|---|---|
| A-GNSS | Yes | Yes | No | No | Yes (UE-based and UE-assisted) |
| Downlink [Note1] | No | Yes | No | No | Yes (UE-assisted) |
| E-CID | No | Yes | Yes | No | Yes (UE-assisted) |
| Uplink | No | No | No | Yes | No |
| Sensor | Yes | Yes | No | No | No |
| WLAN | Yes | Yes | No | No | Yes |
| Bluetooth | No | Yes | No | No | No |
| TBS [Note 2] | Yes | Yes | No | No | Yes (MBS) |

NOTE1:
This includes TBS positioning based on PRS signals.
NOTE 2:
In this version of the specification only for TBS positioning based on MBS signals.

Sensor, WLAN, Bluetooth, and TBS positioning methods based on IVIES signals are also supported in standalone mode, as described in the corresponding sections.

In NR, the positioning is expected to be more measurement focused, where the procedure is more about how to support specific measurement types and how to convert measurements into useful positioning information.

Some example measurements include:

Downlink (DL) measurements, based on either Rel 15 reference signals or new signals, such as new DL positioning reference signals. The DL signals are used to measure quantities such as received power, quality and or timing. The timing can also be associated to a reference time before being used or reported. The measurements can also be associated to quality measurements, rich reporting of finer details of the received signal etc.

Uplink measurements based on UE uplink transmissions. These measurements may need triggering of UL periodic, aperiodic or on demand transmissions. The measurements in network nodes also may need assistance data about the transmitted signals.

Enhanced Cell ID, with essentially encompasses measurements enabled by configurations due to other procedures such as resource or mobility management.

The measurements in UE-assisted mode means that the UE is able to perform measurements that are then reported to a network node. The measurements in UE-based mode are either done by the UE (downlink measurements) or provided to the UE (uplink measurements) to enable the wireless communication device to position itself. For that purpose, the UE may request assistance data from a network node to enable UE-based positioning.

SUMMARY

Some embodiments of the present disclosure are directed to a method of operating a wireless communication device of a radio communication network. The method includes obtaining information identifying at least one of: 1) how often the wireless communication device requests assistance data be provided by a network node of the radio communication network for positioning by the wireless communication device; and 2) how often the wireless communication device performs positioning. The method can further include sending a request for assistance data containing the information toward the network node.

Some other related embodiments are directed to a wireless communication device for operating in a radio communication network. The wireless communication device is configured to obtain information identifying at least one of: 1) how often the wireless communication device requests assistance data be provided by a network node of the radio communication network for positioning by the wireless communication device; and 2) how often the wireless communication device performs positioning. The wireless communication device can be further configured to send a request for assistance data containing the information toward the network node.

Some other related embodiments are directed to a method of operating a serving node that communicates with wireless communication devices and a network node of a radio communication network. The method includes requesting the network node to provide assistance information that identifies wireless communication devices that are configured to use assistance data from the network node for positioning and/or identifies wireless communication devices that have requested assistance data from the network node for positioning.

Some other related embodiments are directed to a method of operating a network node that communicates with a serving node of a radio communication network. The method includes receiving a request from the serving node to identify wireless communication devices that are configured to use assistance data from the network node for positioning and/or to identify wireless communication devices that have requested assistance data from the network node for positioning. The method further includes sending a list of the identified wireless communication devices as content of the assistance information to the serving node.

Some other related embodiments are directed to a network node for communicating with a serving node of a radio communication network. The network node is configured to receive a request from the serving node to identify wireless communication devices that are configured to use assistance data from the network node for positioning and/or to identify wireless communication devices that have requested assistance data from the network node for positioning. The network node can be further configured to send a list of the identified wireless communication devices as content of the assistance information to the serving node.

Potential advantages that may result from one or more of these embodiments of the present disclosure can include that the radio communication network may benefit from: 1) better UE selection for MDT configuration because the RAN node can select those UEs that are performing UE based positioning and thus have the location information available; and/or 2) possible determination of suitable granularity of MDT logs and management report logs which may contain the up-to-date location information associated to MDT or management report related logs. Other objectives, features and advantages of the disclosed embodiments will be apparent from the following description.

Other methods of operating a wireless communication device, wireless communication devices, methods of operating a network node, and network nodes according to embodiments will be or become apparent to one with skill in the art upon review of the following drawings and detailed description. It is intended that all such methods of operating a wireless communication device, wireless communication devices, methods of operating a network node, and network nodes be included within this description, be within the scope of the present disclosure, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
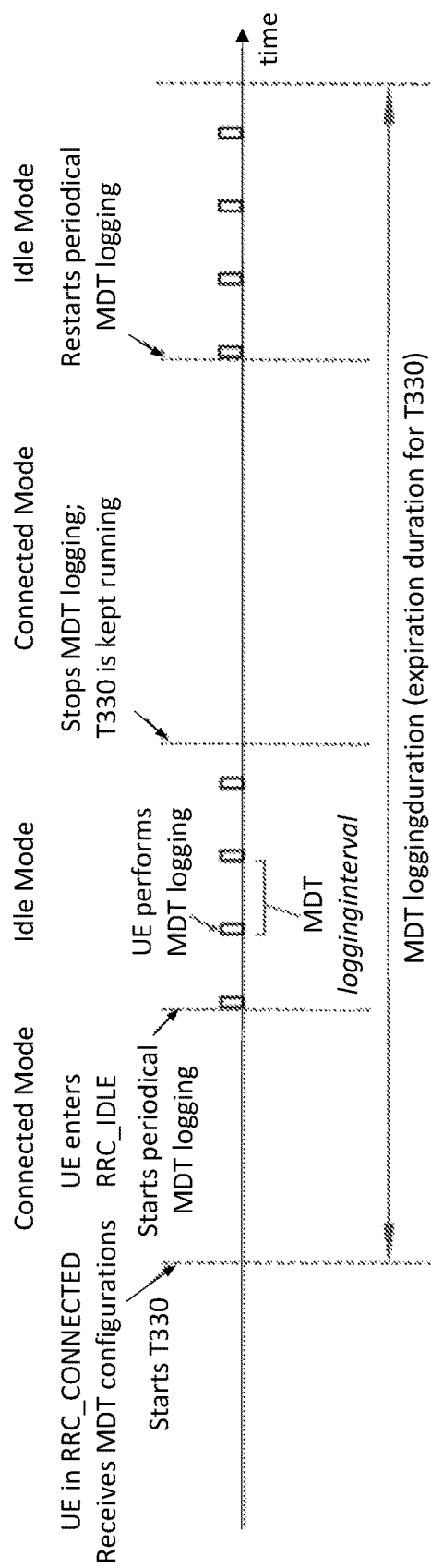
FIG. 1 illustrates an example logged MDT procedure.
Figure 2:
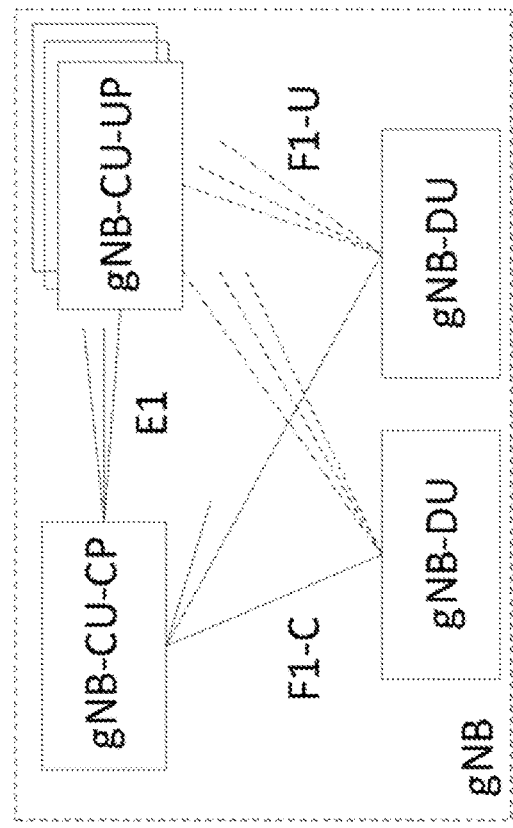
FIG. 2 illustrated an overall architecture for separation of gNB-CU-CP and gNB-CU-UP in accordance with some embodiments.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. Although various embodiments are described below in the context of LTE and NR, these and other embodiments of the present disclosure can be used with other 3GPP and non-3GPP communications standards. The term "UE" and "wireless communication device" are used interchangeably without limitation. Although the term "UE" is used extensively in some 3GPP standards, use of the term herein does not convey that the accompanying embodiment is limited to or preferably used with only those 3GPP standards. Instances of the term "UE" used herein can be replaced with the term "wireless communication device" without changing the meaning of the present disclosure, and vice-versa instances of the term "wireless communication device" can be replaced with the term "UE." The terms "UE" and "wireless communication device" herein may also be interchangeably replaced with the term "radio terminal," "radio communication terminal," "radio device," "mobile device", "wireless device", "wireless terminal", "device", or "user equipment". The term "network node" is used in a non-limiting manner and as explained below, can refer to any type of network node in, or in communication with, a radio communication network. The term "network node" herein may be interchangeably replaced with the term source node, source network node, target node, target network node, target candidate node, primary node, master node, secondary node, gNodeB, eNodeB, ng-eNB, NR node, LTE node, a base station, or a node deployed in a cloud environment.

A potential problem that can occur is that the RAN node (CU-CP) is not aware of which UEs are using the UE based positioning information. This prevents the RAN node from picking the correct UEs for management-based MDT configuration. Moreover, when the UE based positioning related assistance information is provided, there is no relation between the periodicity with which the assistance information is expected to be provided (either dedicated or broadcasted) by the RAN and how often the UE performs logging of measurements for MDT purposes.

To address one or more of these potential problems, some embodiments of the present disclosure are directed to the serving node, which may be a gNB or AMF, being notified about the UE identities which are configured with the UE based positioning method and/or the UE identities of the UEs which have requested for the UE based positioning related assistance information broadcasting.

One or more of these potential problems may alternatively be addressed by some other embodiments of the present disclosure which are directed to the UE logging the MDT or management reporting measurements along with the location information as derived from the UE based or UE-assisted positioning methods, and which may include determining a periodicity of location information determination.

Potential advantages of these and/or other embodiments of the present disclosure is that the radio communication network may benefit from:
1) better UE selection for MDT configuration as the RAN node can select those UEs that are performing UE based positioning and thus have the location information available; and/or
2) possible determination of suitable granularity of MDT logs and management report logs which may contain the up-to-date location information associated to MDT or management report related logs.

2. Embodiments Related to Primarily Operating a Serving Node and Network Node 2.1 a Serving Node is Provided with a List of UEs with UE Based Positing Configurations In this embodiment, the serving node receives a list of UEs in the management-based MDT configuration from a different network node. The so configured list includes the UE IDs of those UEs which are configured with UE based assistance information.

In one embodiment, the serving node is a RAN node such as a gNB or a ng-eNB, and the network node is a core network node such as AMF.

In another embodiment, the serving node is a RAN node such as a gNB, and the network node is an LMF.

Figure 3:
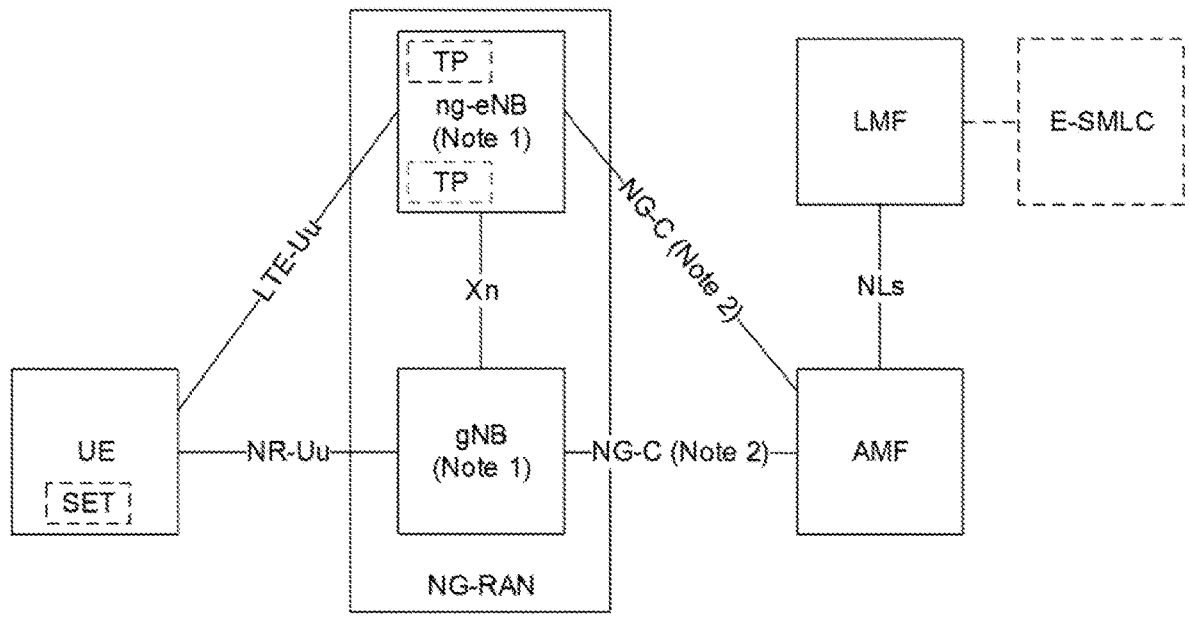
FIG. 3 illustrates NG-RAN Rel-15 LCS Protocols in accordance with some embodiments.

In another embodiment, the serving node is a core network node such as an AMF, and the network node is an LMF. Example operative connections between gNB, ng-eNB, AMF, and LMF nodes are shown in FIG. 3.

2.2 Serving Node Requests Assistance Data for UE Selection

In this embodiment, upon receiving the management-based MDT configuration, the serving node requests the assistance information from a network node (regarding the UE identities that have been configured with the UE based positioning). In response to this request, the network node responds with a list of UE identities that are configured with UE based positioning related assistance information.

Figure 5:
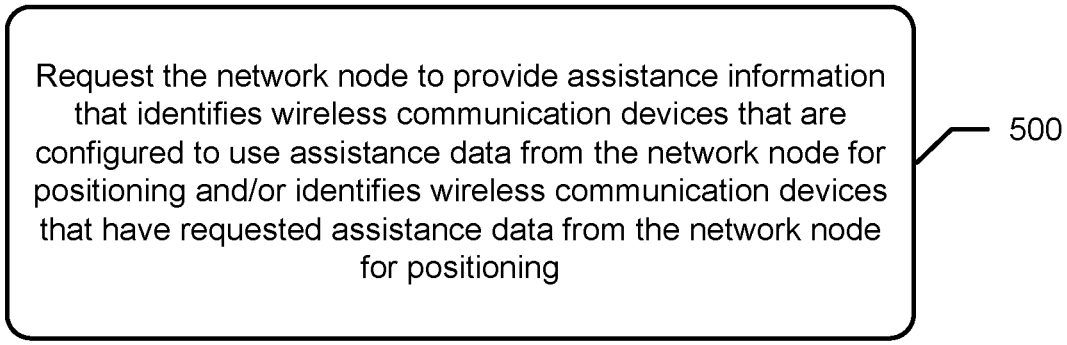
FIG. 5 illustrates a flowchart of operations that can be performed by a serving node in accordance with some embodiments.

FIG. 5 illustrates a flowchart of operations that can be performed by a serving node that communicates with wireless communication devices and a network node of a radio communication network in accordance with some embodiments. Referring to FIG. 5, the operations and associated methods includes requesting (500) the network node to provide assistance information that identifies wireless communication devices that are configured to use assistance data from the network node for positioning and/or identifies wireless communication devices that have requested assistance data from the network node for positioning.

Figure 6:
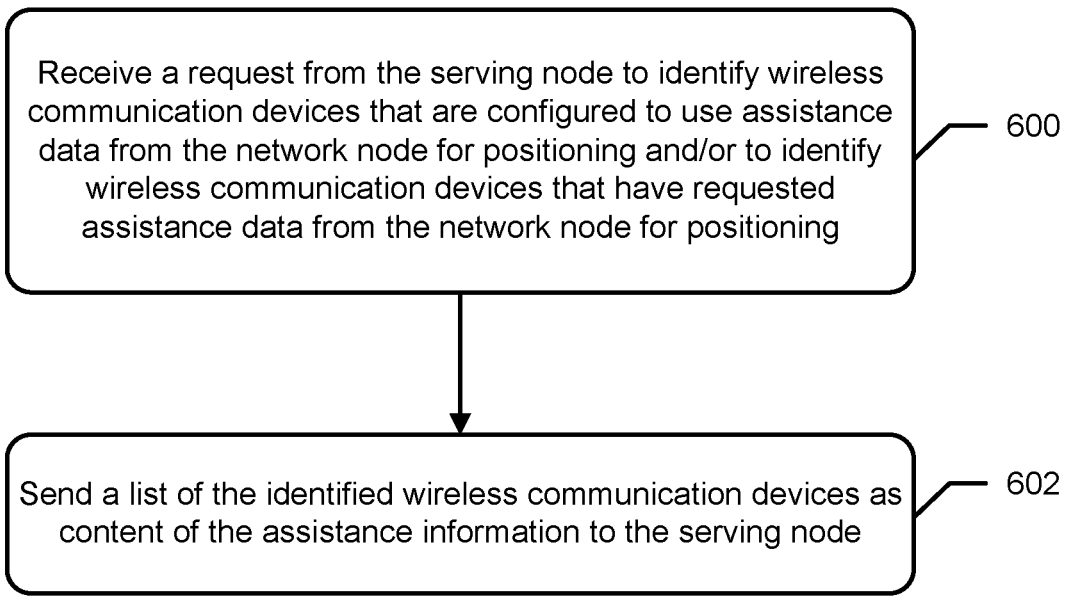
FIG. 6 illustrates a flowchart of operations that can be performed by a network node in accordance with some embodiments.

FIG. 6 illustrates a flowchart of corresponding operations that can be performed by a network node that communicates with a serving node of a radio communication network in accordance with some embodiments. Referring to FIG. 6, the operations and associated methods include receiving (600) a request from the serving node to identify wireless communication devices that are configured to use assistance data from the network node for positioning and/or to identify wireless communication devices that have requested assistance data from the network node for positioning. The operations and associated methods further include sending (602) a list of the identified wireless communication devices as content of the assistance information to the serving node.

In another embodiment, upon receiving the management-based MDT configuration, the serving node requests the assistance information from the network node (regarding whether a specific set, one or more of UEs are configured with the UE based positioning assistance configuration). In response to this request, the network node responds with a list of UE identities that are configured with UE based positioning related assistance information.

Corresponding operations by the serving node to request 500 the network node to provide assistance information may include sending identities of one or more wireless communication devices forming a set to the network node, and requesting the network node to provide assistance information that identifies wireless communication devices among the set that are configured to use assistance data from the network node for positioning and/or identifies wireless communication devices among the set that have requested assistance data from the network node for positioning.

Corresponding operations by the network node when the receiving 600 the request from the serving node, can include receiving identities of one or more wireless communication devices forming a set. Further operations by the network node when sending 602 the list of the identified wireless communication devices as content of the assistance information to the serving node, can include including in the list particular identifiers of wireless communication devices among the set that are configured to use assistance data from the network node for positioning and/or including in the list particular identifiers of wireless communication devices among the set that have requested assistance data from the network node for positioning.

In the above embodiments wherein the serving node requests the network node for assistance information, the serving node can also include (at least) the areaConfig associated to the MDT configuration. The network node uses this information to filter the UE identities who might have relevant assistance information associated to the cells in the areaConfig as provided in the MDT configuration.

Corresponding operations by the serving node to request 500 the network node to provide assistance information, can include requesting the network node to provide assistance information that identifies wireless communication devices that are relevant to an identified areaConfig.

Corresponding operations by the network node when receiving 600 the request from the serving node, can include receiving an identified areaConfig, and the network node can filtering which wireless communication devices are included in the list sent 602 as content of the assistance information to the serving node, based on the identified areaConfig.

In the above embodiments wherein the serving node requests the network node for assistance information, the network node can also include (at least) the list of cells regarding which the assistance information is provided to the UEs listed in the response message from the network node to the serving node. The serving node uses this information to filter the UE identities who might have relevant assistance information associated to the cells in the areaConfig as provided in the MDT configuration.

Corresponding operations by the network node can include sending a list of cells as content of the assistance information to the serving node.

2.3 Other Related Embodiments

In some embodiments, once the serving node has identified that a particular UE has the relevant assistance information for UE based positioning, the serving node can include this information as part of the information exchanged between the neighbor nodes either at handover and/or at the UE context retrieval.

3. Embodiments Related to Primarily Operating a Wireless Communication Device (UE)

Figure 4:
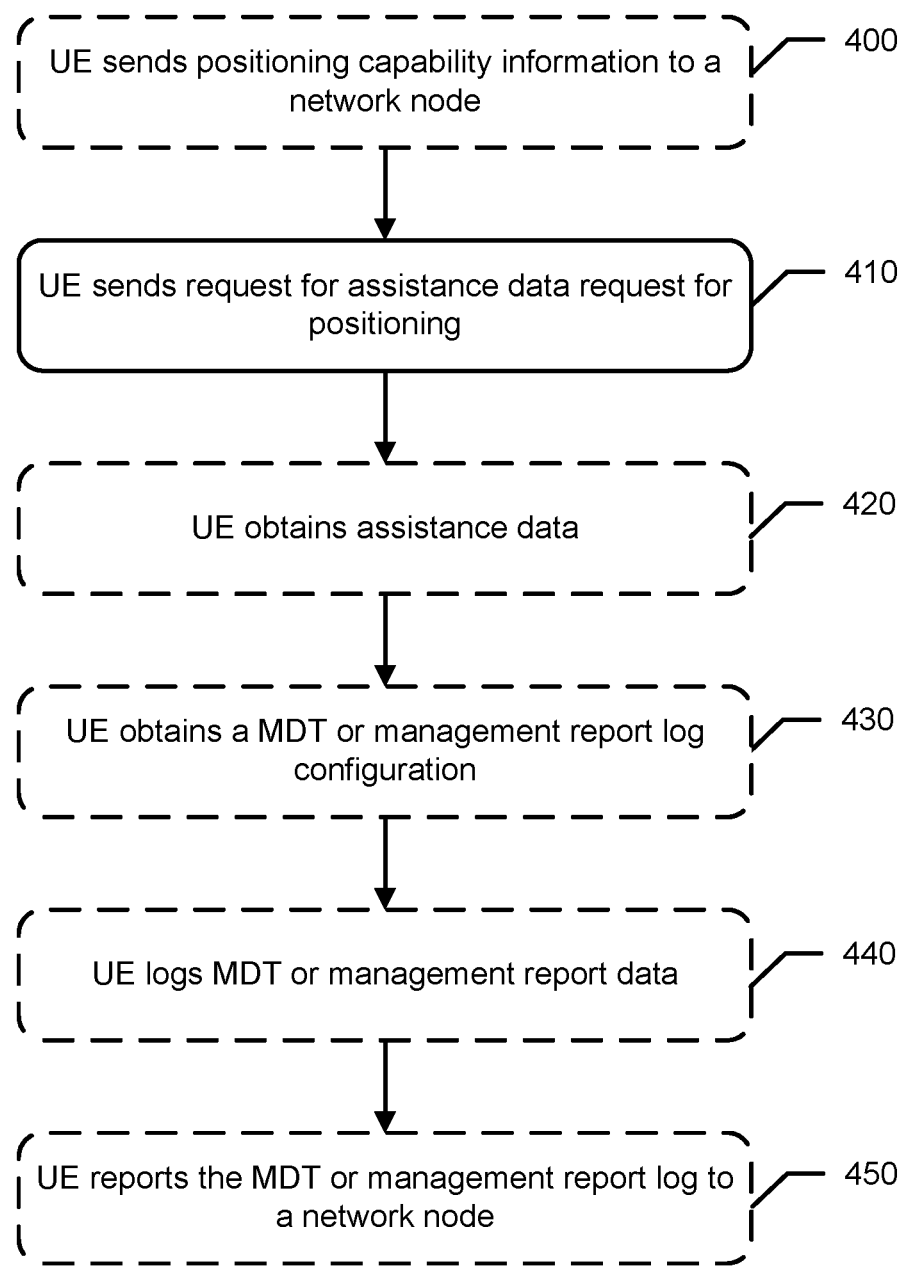
FIG. 4 illustrates a flowchart of operations that can be performed by a wireless communication device, such as a UE, in accordance with some embodiments.

FIG. 4 is a flowchart of operations that can be performed by a UE or other wireless communication device in accordance with one or more embodiments. Although FIG. 4 illustrates six steps 400-450, a wireless communication device can be configured to perform less of the steps. For example, a wireless communication device may be configured to perform only step 410 and not the other steps, or may be configured to perform step 410 in combination with one or more other steps. Accordingly, steps 400, 420, 430, 440, and 450 have been illustrated in dashed boxes to indicate they are optional steps. Referring to FIG. 4, the wireless communication device may perform steps that include the following:

Step 400 of FIG. 4 can be optionally performed by the UE. In step 400, the UE sends positioning capability information to a network node identifying what positioning capabilities are supported by the UE. The position capability information may indicate specific UE-based positioning capabilities such as any one or more of the following options 1 to 3.

Option 1—The capability information may comprise what positioning measurements the wireless communication device supports, what assistance data the wireless communication device supports, what positioning modes the wireless communication device supports (e.g., UE configured to determine positioning using assistance information from network node, UE not configured to use assistance information from network node when determining positioning, etc.), what positioning methods the wireless communication device supports, what MDT (positioning configuration) features the wireless communication device supports, what MDT measurements the wireless communication device supports, what location information aspects the wireless communication device supports etc. Example positioning modes that can be indicated through the capability information include, without limitation, any one or more of: network-assisted GNSS methods, downlink positioning, enhanced cell ID method, uplink positioning, WLAN method, Bluetooth method, Terrestrial Beacon System (TBS) method, sensor based methods, barometric pressure sensor, and motion sensor. Example positioning methods that can be indicated through the capability information include, without limitation, any one or more of: time of arrival; time difference of arrival, angle of arrival, etc.

Accordingly, the position capability information that is sent 400 may identify at least one of: 1) what positioning measurements the wireless communication device supports; 2) what assistance data the wireless communication device supports for positioning; 3) what positioning modes the wireless communication device supports; 4) what positioning methods the wireless communication device supports; 5) what positioning configuration features the wireless communication device supports; 6) what positioning configuration measurements the wireless communication device supports; and 7) what location information aspects the wireless communication device supports.

Option 2—The capability information may be provided to one and the same network node, or to separate network nodes. In one example mode, the positioning capabilities are provided to a location server and the MDT capabilities are provided to a serving node such as the gNB.

Accordingly, the position capability information that is sent 400 may be sent to a serving node within a radio access node or to an Access and Mobility management Function.

Option 3—The positioning capabilities may comprise how frequent the wireless communication device is capable of receiving assistance data, how frequent the wireless communication device is capable of determining its position using UE-based positioning, how often the wireless communication device is capable of reporting positioning measurements, etc.

Accordingly, the position capability information that is sent 400 may identify at least one of: 1) how frequent the wireless communication device is capable of receiving assistance data; 2) how frequent the wireless communication device is capable of determining its position with network assistance; and 3) how often the wireless communication device is capable of reporting positioning measurements.

As will be explained in further detail below, the "periodical MDT logging" of FIG. 1 can correspond to a "desiredAssistancePeriodicity", and the "logginginterval" of FIG. 1 can correspond to a "desiredAssistanceInterval". In at least some embodiments, the desired periodicity is defined as the duration corresponding to MDT logging duration. This means that when the UE is configured for the MDT measurement it is also seeking assistance data for positioning. In addition, the UE may also seek for assistance data for positioning when it is performing the MDT logging. Furthermore, based on the MDT configuration the UE may determine periodicity or interval for position determination and can inform the network about it via its desired positioning periodicity and/or desired positioning interval.

Referring to step 410 of FIG. 4, the UE sends a request for assistance data for positioning.

The method of operating the UE or other wireless communication device may include obtaining 410 information identifying at least one of: 1) how often the wireless communication device requests assistance data be provided by a network node of the radio communication network for positioning by the wireless communication device; and 2) how often the wireless communication device performs positioning, and sending (410) a request for assistance data containing the information toward the network node.

In one embodiment, the assistance data request comprises information needed for UE-based positioning.

In a further embodiment, the UE provides information about the desired assistance data periodicity (desiredAssistancePeriodicity) or desired assistance data interval (desiredAssistanceInterval) to support UE-based positioning, or any other parameter associated to how often the wireless communication device requests assistance data for UE-based positioning.

Accordingly, the information sent 410 toward the network node identifying how often wireless communication device requests assistance data be provided by the network node, may further identify a desired assistance data periodicity or identifies a desired assistance data interval within a cycle of the desired assistance data periodicity.

In an alternative or additional further embodiment, the UE provides information about the desired periodicity of positioning determination (desiredPositioningPeriodicity) in the wireless communication device, or the desired interval of positioning determination (desiredPositioningInterval) in the wireless communication device, or any other parameter associated to how often the wireless communication device determines a UE-based position estimate.

Accordingly, the information sent 410 toward the network node identifying how often the wireless communication device performs positioning, may further identify a desired periodicity of the positioning by the wireless communication device or identifies a desired interval of the positioning within a cycle of the desired periodicity of the positioning.

Referring to step 420 of FIG. 4, the UE obtains assistance data for positioning that is provided by the network node.

In a further embodiment, the provided assistance data periodicity (providedAssistancePeriodicity) or interval (providedAssistanceInterval) is related to the requested periodicity (desiredAssistancePeriodicity) or interval (desiredAssistanceInterval) of the assistance data provisioning (or if the assistance data periodicity/interval is related to some other parameter).

Accordingly, the wireless communication device may obtain 420 the assistance data at a periodicity or an interval within a cycle of the periodicity that is known to the wireless communication device based on the information sent 410 toward the network node identifying a desired assistance data periodicity or a desired assistance data interval within a cycle of the periodicity at which the wireless communication device requests assistance data be provided by the network node for the positioning by the wireless communication device.

In an alternative or additional further embodiment, the provided assistance data periodicity (providedAssistancePeriodicity) or interval (providedAssistanceInterval) is different from the requested periodicity (desiredAssistancePeriodicity) or interval (desiredAssistanceInterval) of the assistance data provisioning (or if the assistance data periodicity/interval is related to some other parameter).

Accordingly, the wireless communication device may obtain 420 the assistance data at a periodicity or an interval within a cycle of the periodicity that is not based on the information sent in the request for assistance data toward the network node.

In an alternative or additional further embodiment, the provided assistance data periodicity or interval is based on the desired periodicity of positioning determination (desiredPositioningPeriodicity) in the wireless communication device, or the desired interval of positioning determination (desiredPositioningInterval).

Accordingly, the wireless communication device may obtain 420 the assistance data at a periodicity or an interval within a cycle of the periodicity that is known to the wireless communication device based on the information sent (410) toward the network node identifying a desired periodicity of the positioning by the wireless communication device or a desired interval of the positioning by the wireless communication device within the desired periodicity of the positioning.

Referring to step 430 of FIG. 4, the UE obtains a MDT or management report log configuration.

In one embodiment for MDT, the configuration comprises a logging periodicity (loggingPeriodicity) or logging interval (loggingInterval). Accordingly, the management reporting log configuration that is obtained 430 may identify a logging periodicity or a logging interval within a cycle of the logging periodicity at which the wireless communication device is to log position.

In a further embodiment, if the logging periodicity or logging interval does not match the periodicity or interval of the assistance data or the positioning determination, and the UE checks if the MDT logging interval is larger than the assistance interval as used in the UE based positioning method. If so, the UE requests the network for more often transmission of assistance information and the newly requested assistance interval shall be same as MDT or management report logging interval.

Accordingly, when the logging periodicity or the logging interval does not match a periodicity or interval of assistance data obtained from the network node or does not match a periodicity or interval at which the wireless communication device performs positioning, and when the logging interval is larger than an assistance interval used by the wireless communication device for positioning, requesting, e.g., 410, the network node to provide more often transmission of assistance data at a newly requested assistance interval.

In an alternative or additional further embodiment, the UE instead requests to support a different MDT or management report logging interval or periodicity that matches the positioning assistance data periodicity or interval, or positioning determination periodicity or interval.

Accordingly, when the logging periodicity or the logging interval does not match a periodicity or interval of assistance data obtained from the network node or does not match a periodicity or interval at which the wireless communication device performs positioning, and when the logging interval is larger than an assistance interval used by the wireless communication device for positioning, requesting the network node to support a different logging periodicity.

Referring to step 440 of FIG. 4, the UE logs MDT or management report data of determined positioning. Therefore, the UE can perform management report logging of determined positioning at a logging interval.

In one embodiment, the availability of UE location information is associated to the positioning interval or periodicity.

In a further embodiment, if the logging interval is longer than or the same as the desired interval of positioning determination, then the UE logs positioning information with the logging interval, where the positioning information is at most outdated by the desired interval of positioning determination. If periodicity is used instead of interval to define the related parameters, then a corresponding reasoning is considered, based on corresponding intervals determined from the periodicity.

Accordingly, when the logging interval is longer than or equal to a desired interval for the wireless communication device to perform positioning, the management report logging is performed at each instance of the logging interval, wherein the logging interval is defined in a management reporting log configuration obtained by the wireless communication device.

In an alternative or additional further embodiment, if the logging interval is shorter than the desired interval of positioning determination, then the UE logs the most recent positioning information at each logging interval. If periodicity is used instead of interval to define the related parameters, then a corresponding reasoning is considered, based on corresponding intervals determined from the periodicity.

Accordingly, when the logging interval is shorter than a desired interval for the wireless communication device to perform positioning, the management report logging logs a most recently determined positioning information at each instance of the logging interval, wherein the logging interval is defined in a management reporting log configuration obtained by the wireless communication device.

In some other embodiments, the availability of UE location information is associated to the positioning assistance data interval or periodicity.

If the logging interval is longer than or the same as the interval of positioning assistance data, then the UE logs positioning information with the logging interval, where the positioning information is at most outdated by the positioning assistance data interval. If periodicity is used instead of interval to define the related parameters, then a corresponding reasoning is considered, based on corresponding intervals determined from the periodicity.

Accordingly, when the logging interval is longer than or equal to an interval of positioning assistance information obtained by the wireless communication device, the management report logging is performed at each instance of the logging interval, wherein the logging interval is defined in a management reporting log configuration obtained by the wireless communication device.

If the logging interval is shorter than the interval of positioning assistance data, then the UE logs the most recent positioning information at each logging interval. If periodicity is used instead of interval to define the related parameters, then a corresponding reasoning is considered, based on corresponding intervals determined from the periodicity.

Accordingly, when the logging interval is shorter than an interval of positioning assistance information obtained by the wireless communication device, the management report logging logs a most recently determined positioning information at each instance of the logging interval, wherein the logging interval is defined in a management reporting log configuration obtained by the wireless communication device.

In some other embodiments, the UE adapts the MDT or management report log periodicity or interval based on the desired interval or periodicity of positioning determination and/or the interval or periodicity of positioning assistance data.

In such scenarios, the UE may compute the minimum of these two intervals and the UE uses this interval for performing the MDT related logging and in each such log, the UE shall include the location information as derived based on the UE based positioning method.

Accordingly, the UE or other wireless communication device adapts the logging interval based on a minimum of: 1) the periodicity at which the wireless communication device requests assistance data be provided by the network node; and 2) how often the wireless communication device performs positioning.

Referring to step 450 of FIG. 4, the UE reports the MDT or management report log to a network node.

4. Summary of Some Embodiments

Some embodiments provide methods, serving nodes and network nodes that enable the radio communication network to select wireless communication devices to configure for MDT based on information about how wireless communication devices are configured for UE-based positioning.

Some other embodiments provide methods, serving nodes and network nodes that enable the radio communication network to ensure that the MDT or management report logging matches the wireless communication device (UE)-based or wireless communication device (UE)-assisted positioning. Also, a configured wireless communication device (UE)-assisted or wireless communication device (UE)-based positioning mandates inclusion of location information in the MDT or management report log.

Example Wireless Communication Device

Figure 7:
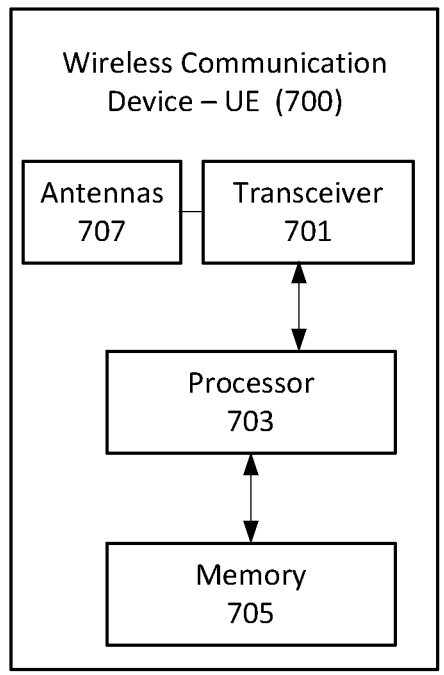
FIG. 7 is a block diagram of elements of a wireless communication device, such as a UE, that are configured according to some embodiments of the present disclosure.

FIG. 7 is a block diagram illustrating a wireless communication device 700 having components that are configured according to some embodiments. The wireless communication device 700 includes at least one processor 703 (also referred to as processor), at least one memory 705 (also referred to as memory), and at least one transceiver circuit 701 (also referred to as a transceiver) including a transmitter and a receiver configured to provide radio communications through at least one antenna 707, e.g., one or more arrays of MIMO antennas, with a radio access networks (RANs) of a radio communications network. The processor 703 is operatively connected to the transceiver 701 which is connected to the antenna 707 for transmitting and receiving signals. The processor 703 may include one or more data processing circuits, such as a general purpose and/or special purpose processor (e.g., microprocessor and/or digital signal processor) that may be collocated or distributed across one or more networks. The memory 705, described below as a computer readable medium, stores computer readable program code that when executed by the processor 703 causes the processor 703 to perform operations according to embodiments disclosed herein. According to other embodiments, the processor 703 may be defined to include memory so that a separate memory is not required. The wireless communication device 700 may also include user output interface, e.g., display device and/or speaker interface, and/or a user input interface, e.g., touch screen, keyboard, etc.

Example Serving Node

Figure 8:
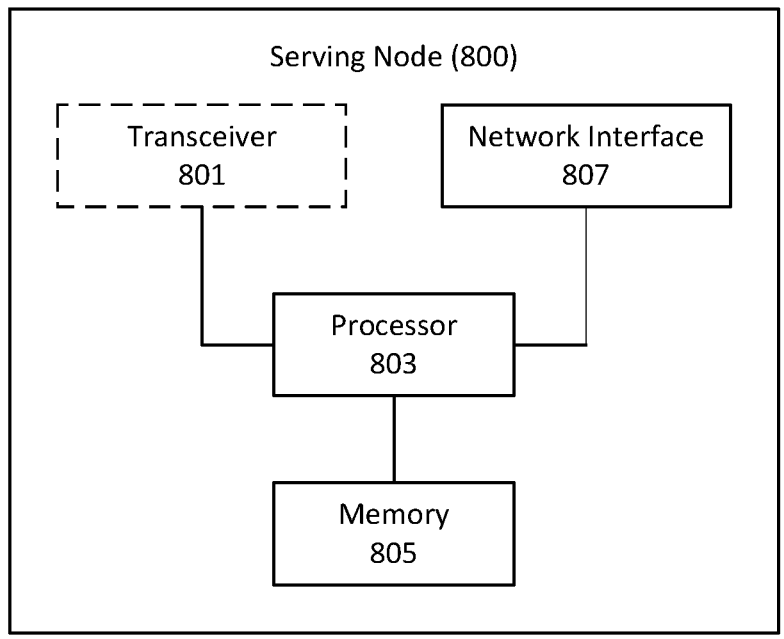
FIG. 8 is a block diagram of elements of a serving node that are configured according to some embodiments of the present disclosure.

FIG. 8 is a block diagram of a serving node 800, which may correspond to the gNB, ng-eNB, or AMF in FIG. 3, that is configured according to some embodiments. The serving node 800 includes at least one network interface 807, at least one processor 803 (also referred to as processor), and at least one memory 805 (also referred to as memory) containing program code. The serving node 800 may optionally include at least one transceiver circuit 801 (also referred to as a transceiver) including a transmitter and a receiver configured to provide radio communications through at least one antenna, e.g., one or more arrays of MIMO antennas, with a wireless communication devices of a radio communications network. The processor 803 may include one or more data processing circuits, such as a general purpose and/or special purpose processor (e.g., microprocessor and/or digital signal processor) that may be collocated or distributed across one or more networks. The memory 805, described below as a computer readable medium, stores computer readable program code that when executed by the processor 803 causes the processor 803 to perform operations according to embodiments disclosed herein. According to other embodiments, the processor 803 may be defined to include memory so that a separate memory is not required.

Example Network Node

Figure 9:
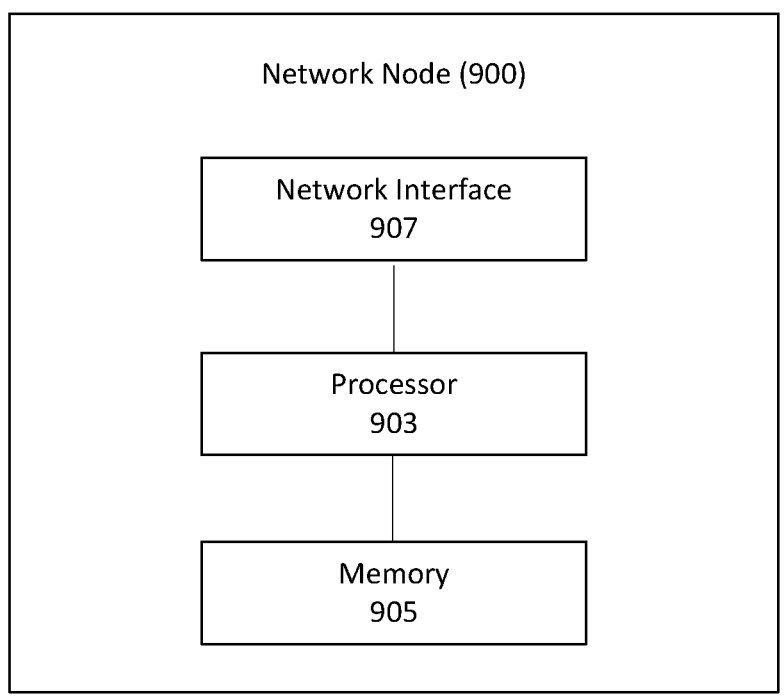
FIG. 9 is a block diagram of elements of a network node that are configured according to some embodiments of the present disclosure.

FIG. 9 is a block diagram of a network node 900, which may correspond to the AMF or LMF in FIG. 3, that is configured according to some embodiments. The network node 900 includes at least one network interface 907, at least one processor 903 (also referred to as processor), and at least one memory 905 (also referred to as memory) containing program code. The processor 903 may include one or more data processing circuits, such as a general purpose and/or special purpose processor (e.g., microprocessor and/or digital signal processor) that may be collocated or distributed across one or more networks. The memory 905, described below as a computer readable medium, stores computer readable program code that when executed by the processor 903 causes the processor 903 to perform operations according to embodiments disclosed herein. According to other embodiments, the processor 903 may be defined to include memory so that a separate memory is not required.

Listing of Embodiments

1. A method of operating a wireless communication device of a radio communication network, the method comprising:
obtaining (410) information identifying at least one of: 1) how often the wireless communication device requests assistance data be provided by a network node of the radio communication network for positioning by the wireless communication device; and 2) how often the wireless communication device performs positioning; and
sending (410) a request for assistance data containing the information toward the network node.

2. The method of Embodiment 1, wherein the information sent (410) toward the network node identifies how often wireless communication device requests assistance data be provided by the network node, which further identifies a desired assistance data periodicity or identifies a desired assistance data interval within a cycle of the desired assistance data periodicity.

3. The method of any of Embodiments 1 to 2, wherein the information sent (410) toward the network node identifies how often the wireless communication device performs positioning, which further identifies a desired periodicity of the positioning by the wireless communication device or identifies a desired interval of the positioning within a cycle of the desired periodicity of the positioning.

4. The method of any of Embodiments 1 to 3, further comprising:
sending (400) positioning capability information identifying what positioning capabilities are supported by the wireless communication device, toward the network node.

5. The method of Embodiment 4, wherein the positioning capability information that is sent (400) identifies at least one of: 1) what positioning measurements the wireless communication device supports; 2) what assistance data the wireless communication device supports for positioning; 3) what positioning modes the wireless communication device supports; 4) what positioning methods the wireless communication device supports; 5) what positioning configuration features the wireless communication device supports; 6) what positioning configuration measurements the wireless communication device supports; and 7) what location information aspects the wireless communication device supports.

6. The method of any of Embodiments 4 to 5, wherein the positioning capability information is sent (400) to a serving node within a radio access node or to an Access and Mobility management Function.

7. The method of any of Embodiments 4 to 6, wherein the positioning capability information that is sent (400) identifies at least one of: 1) how frequent the wireless communication device is capable of receiving assistance data; 2) how frequent the wireless communication device is capable of determining its position with network assistance; and 3) how often the wireless communication device is capable of reporting positioning measurements.

8. The method of any of Embodiments 1 to 7, further comprising:
obtaining (420) assistance data for positioning from the network node.

9. The method of Embodiment 8, wherein the wireless communication device obtains (420) the assistance data at a periodicity or an interval within a cycle of the periodicity that is known to the wireless communication device based on the information sent (410) toward the network node identifying a desired assistance data periodicity or a desired assistance data interval within a cycle of the periodicity at which the wireless communication device requests assistance data be provided by the network node for the positioning by the wireless communication device.

10. The method of Embodiment 8, wherein the wireless communication device obtains (420) the assistance data at a periodicity or an interval within a cycle of the periodicity that is not based on the information sent in the request for assistance data toward the network node.

11. The method of Embodiment 8, wherein the wireless communication device obtains (420) the assistance data at a periodicity or an interval within a cycle of the periodicity that is known to the wireless communication device based on the information sent (410) toward the network node identifying a desired periodicity of the positioning by the wireless communication device or a desired interval of the positioning by the wireless communication device within the desired periodicity of the positioning.

12. The method of any of Embodiments 1 to 11, further comprising:
obtaining (430) a management reporting log configuration.

13. The method of Embodiment 12, wherein the management reporting log configuration that is obtained (430) identifies a logging periodicity or a logging interval within a cycle of the logging periodicity at which the wireless communication device is to log position.

14. The method of Embodiment 13, further comprising:
when the logging periodicity or the logging interval does not match a periodicity or interval of assistance data obtained from the network node or does not match a periodicity or interval at which the wireless communication device performs positioning, and when the logging interval is larger than an assistance interval used by the wireless communication device for positioning, requesting (410) the network node to provide more often transmission of assistance data at a newly requested assistance interval.

15. The method of Embodiment 13, further comprising:
when the logging periodicity or the logging interval does not match a periodicity or interval of assistance data obtained from the network node or does not match a periodicity or interval at which the wireless communication device performs positioning, and when the logging interval is larger than an assistance interval used by the wireless communication device for positioning, requesting (410) the network node to support a different logging periodicity.

16. The method of any of Embodiments 1 to 15, further comprising:
performing management report logging of determined positioning at a logging interval.

17. The method of Embodiment 16, wherein:
when the logging interval is longer than or equal to a desired interval for the wireless communication device to perform positioning, the management report logging is performed at each instance of the logging interval, wherein the logging interval is defined in a management reporting log configuration obtained by the wireless communication device.

18. The method of any of Embodiments 16 to 17, wherein:
when the logging interval is shorter than a desired interval for the wireless communication device to perform positioning, the management report logging logs a most recently determined positioning information at each instance of the logging interval, wherein the logging interval is defined in a management reporting log configuration obtained by the wireless communication device.

19. The method of any of Embodiments 16 to 18, wherein:
when the logging interval is longer than or equal to an interval of positioning assistance information obtained by the wireless communication device, the management report logging is performed at each instance of the logging interval, wherein the logging interval is defined in a management reporting log configuration obtained by the wireless communication device.

20. The method of any of Embodiments 16 to 19, wherein:
when the logging interval is shorter than an interval of positioning assistance information obtained by the wireless communication device, the management report logging logs a most recently determined positioning information at each instance of the logging interval, wherein the logging interval is defined in a management reporting log configuration obtained by the wireless communication device.

21. The method of any of Embodiments 16 to 20, further comprising:
adapting the logging interval based on a minimum of: 1) the periodicity at which the wireless communication device requests assistance data be provided by the network node; and 2) how often the wireless communication device performs positioning.

22. A wireless communication device (700) configured to perform the method of any of Embodiments 1 to 21.

23. A computer program product comprising a non-transitory computer readable medium storing program instructions that are executable by at least one process of a wireless communication device to perform the method of any of Embodiments 1 to 21.

24. A wireless communication device (700) for operating in a radio communication network, the wireless communication device (700) configured to:
obtain information identifying at least one of: 1) how often the wireless communication device requests assistance data be provided by a network node of the radio communication network for positioning by the wireless communication device; and 2) how often the wireless communication device performs positioning; and
sending a request for assistance data containing the information toward the network node.

25. The wireless communication device (700) of Embodiment 24 further configured to perform the method of any of Embodiments 2 to 21.

26. A method of operating a serving node that communicates with wireless communication devices and a network node of a radio communication network, the method comprising:
requesting (500) the network node to provide assistance information that identifies wireless communication devices that are configured to use assistance data from the network node for positioning and/or identifies wireless communication devices that have requested assistance data from the network node for positioning.

27. The method of Embodiment 26, wherein the request (500) for the network node to provide assistance information that identifies wireless communication devices that are configured to use assistance data from the network node for positioning and/or identifies wireless communication devices that have requested assistance data from the network node for positioning, comprises:

sending identities of one or more wireless communication devices forming a set to the network node; and requesting the network node to provide assistance information that identifies wireless communication devices among the set that are configured to use assistance data from the network node for positioning and/or identifies wireless communication devices among the set that have requested assistance data from the network node for positioning.

28. The method of any of Embodiments 26 to 27, wherein the request (500) for the network node to provide assistance information that identifies wireless communication devices that are configured to use assistance data from the network node for positioning and/or identifies wireless communication devices that have requested assistance data from the network node for positioning, comprises:

requesting the network node to provide assistance information that identifies wireless communication devices that are relevant to an identified areaConfig.

29. A serving node (800) configured to perform the method of any of Embodiments 26 to 28.

30. A computer program product comprising a non-transitory computer readable medium storing program instructions that are executable by at least one process of a serving node (800) to perform the method of any of Embodiments 26 to 28.

31. A serving node (800) for communicating with wireless communication devices (700) and a network node (900) of a radio communication network, the serving node (800) configured to:

request the network node to provide assistance information that identifies wireless communication devices that are configured to use assistance data from the network node for positioning and/or identifies wireless communication devices that have requested assistance data from the network node for positioning.

32. The serving node (800) of Embodiment 31 further configured to perform the method of any of Embodiments 27 to 28.

33. A method of operating a network node that communicates with a serving node of a radio communication network, the method comprising:

receiving (600) a request from the serving node to identify wireless communication devices that are configured to use assistance data from the network node for positioning and/or to identify wireless communication devices that have requested assistance data from the network node for positioning; and sending (602) a list of the identified wireless communication devices as content of the assistance information to the serving node.

34. The method of Embodiment 33, wherein the receiving (600) the request from the serving node, comprises receiving identities of one or more wireless communication devices forming a set; and wherein the sending (602) of the list of the identified wireless communication devices as content of the assistance information to the serving node, comprises including in the list particular identifiers of wireless communication devices among the set that are configured to use assistance data from the network node for positioning and/or including in the list particular identifiers of wireless communication devices among the set that have requested assistance data from the network node for positioning.

35. The method of any of Embodiments 33 to 34, wherein the receiving (600) the request from the serving node, comprises receiving an identified areaConfig; and further comprising filtering which wireless communication devices are included in the list sent (602) as content of the assistance information to the serving node, based on the identified areaConfig.

36. The method of any of Embodiments 33 to 35, further comprising sending a list of cells as content of the assistance information to the serving node.

37. A network node (900) configured to perform the method of any of Embodiments 33 to 36.

38. A computer program product comprising a non-transitory computer readable medium storing program instructions that are executable by at least one process of a network node (900) to perform the method of any of Embodiments 33 to 36.

39. A network node (900) for communicating with a serving node (800) of a radio communication network, the network node (900) configured to:

receive a request from the serving node to identify wireless communication devices that are configured to use assistance data from the network node for positioning and/or to identify wireless communication devices that have requested assistance data from the network node for positioning; and send a list of the identified wireless communication devices as content of the assistance information to the serving node.

40. The network node (900) of Embodiment 39 further configured to perform the method of any of Embodiments 34 to 36.

41. A wireless communication device (700) for operating in a radio communication network, the wireless communication device (700) comprising:

at least one transceiver;

at least one processor operatively connected to the at least one transceiver; and at least one memory storing program code executable by the at least one processor to:

obtain information identifying at least one of: 1) how often the wireless communication device requests assistance data be provided by a network node of the radio communication network for positioning by the wireless communication device; and 2) how often the wireless communication device performs positioning; and send a request for assistance data containing the information toward the network node.

42. The wireless communication device (700) of Embodiment 41 wherein the at least one processor executing the program code is further configured to perform the method of any of Embodiments 2 to 21.

43. A serving node (800) for communicating with wireless communication devices (700) and a network node (900) of a radio communication network, the serving node (800) comprising:

at least one network interface;

at least one processor operatively connected to the at least one network interface; and at least one memory storing program code executable by the at least one processor to:

request the network node to provide assistance information that identifies wireless communication devices that are configured to use assistance data from the network node for positioning and/or identifies wireless communication devices that have requested assistance data from the network node for positioning.

44. The serving node (800) of Embodiment 43 wherein the at least one processor executing the program code is further configured to perform the method of any of Embodiments 27 to 28.

45. A network node (900) for communicating with a serving node (800) of a radio communication network, the network node (900) comprising:
at least one network interface;
at least one processor operatively connected to the at least one network interface; and
at least one memory storing program code executable by the at least one processor to:
receive a request from the serving node to identify wireless communication devices that are configured to use assistance data from the network node for positioning and/or to identify wireless communication devices that have requested assistance data from the network node for positioning; and
send a list of the identified wireless communication devices as content of the assistance information to the serving node.

46. The network node (900) of Embodiment 45 wherein the at least one processor executing the program code is further configured to perform the method of any of Embodiments 34 to 36.

Explanations for abbreviations from the above disclosure are provided below:

Abbreviation Explanation eNB eNodeB Base station supporting LTE air interface
E-SMLC Evolved Serving Mobile Location Center
E-UTRAN Evolved Universal Terrestrial Radio Access Network
gNB Base station supporting NR air interface
gNB-CU gNB Central Unit
gNB-CU-CP gNB-CU Control Plane
gNB-CU-UP gNB-CU User Plane
gNB-DU gNB Distributed Unit
LTE Long Term Evolution
LMU Location Measurement Unit
MBS Metropolitan Beacon System
GNSS Global Navigation and Satellite System
RRC Radio Resource Control
AMF Access and Mobility management Function
DL Downlink
IE Information Element
LMF Location Management Function
MDT Minimizing Drive Test
NGAP Next Generation Application Protocol
Ng-eNB Next Generation eNB
NG-RAN Next Generation Radio Access Network
NR New Radio
PHR Power Headroom Report
QoS Quality of Service
UL Uplink
UE User Equipment
RACH Random Access Channel
RAN Radio Access Network
RRM Radio Resource Management
RRC Radio Resource Control
RSRP Reference Signal Received Power
RSRQ Reference Signal Received Quality
TBS Terrestrial Beacon System
WLAN Wireless Local Area Network Further definitions and embodiments are discussed below:

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 10:
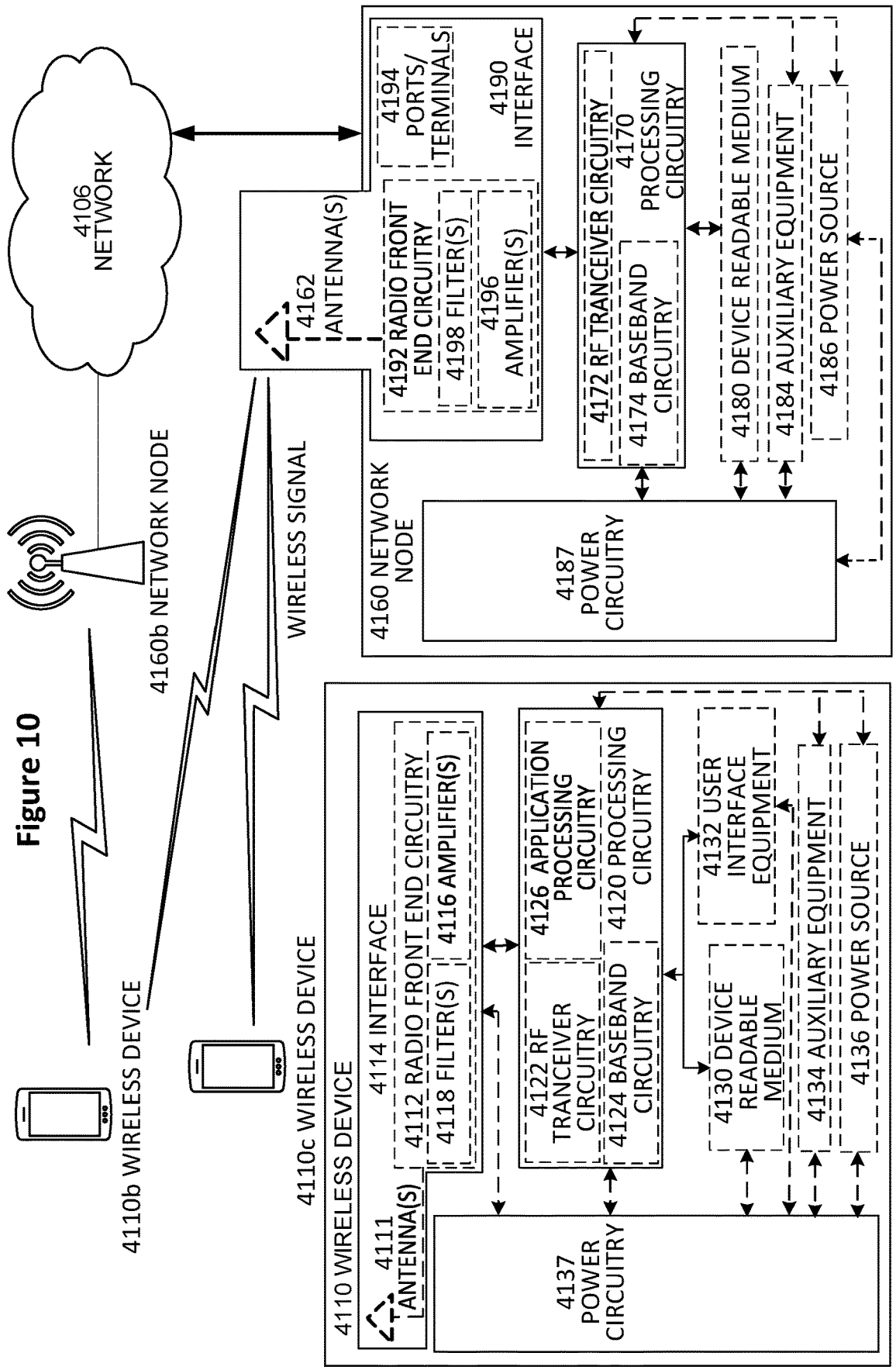
FIG. 10 is a block diagram of a wireless network in accordance with some embodiments of the present disclosure.

FIG. 10 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 10 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. As explained above, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 11:
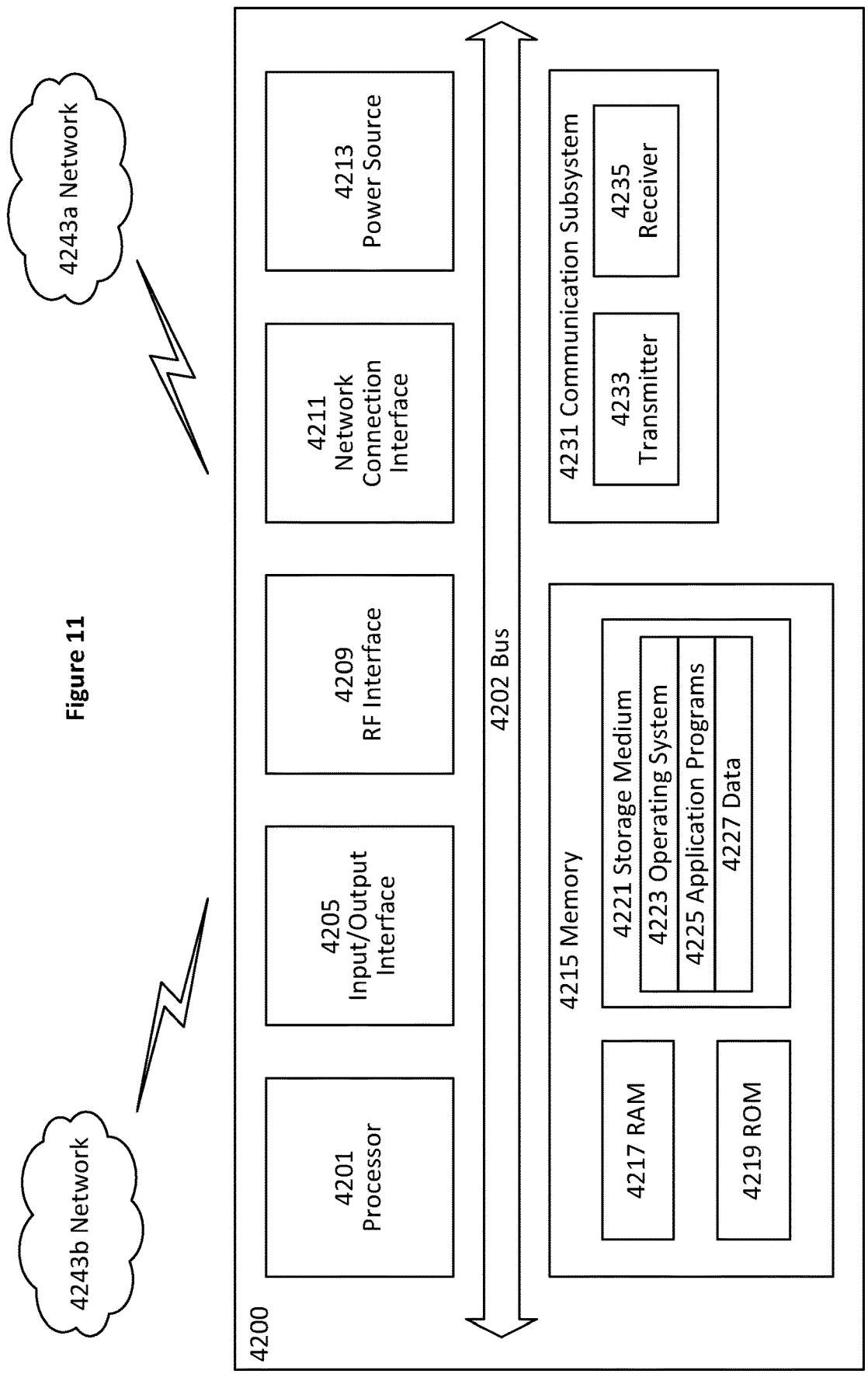
FIG. 11 is another block diagram of a wireless communication device, such as a UE, in accordance with some embodiments of the present disclosure.

FIG. 11 illustrates a user Equipment in accordance with some embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 4209 may be configured to provide a communication interface to RF components such as a transmitter, a receiver, and an antenna. Network connection interface 4211 may be configured to provide a communication interface to network 4243a. Network 4243a may encompass wired and/or wireless networks such as a local-area network (LAN), a wide-area network (WAN), a computer network, a wireless network, a telecommunications network, another like network or any combination thereof. For example, network 4243a may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 11, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network (LAN), a wide-area network (WAN), a computer network, a wireless network, a telecommunications network, another like network or any combination thereof. For example, network 4243b may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 12:
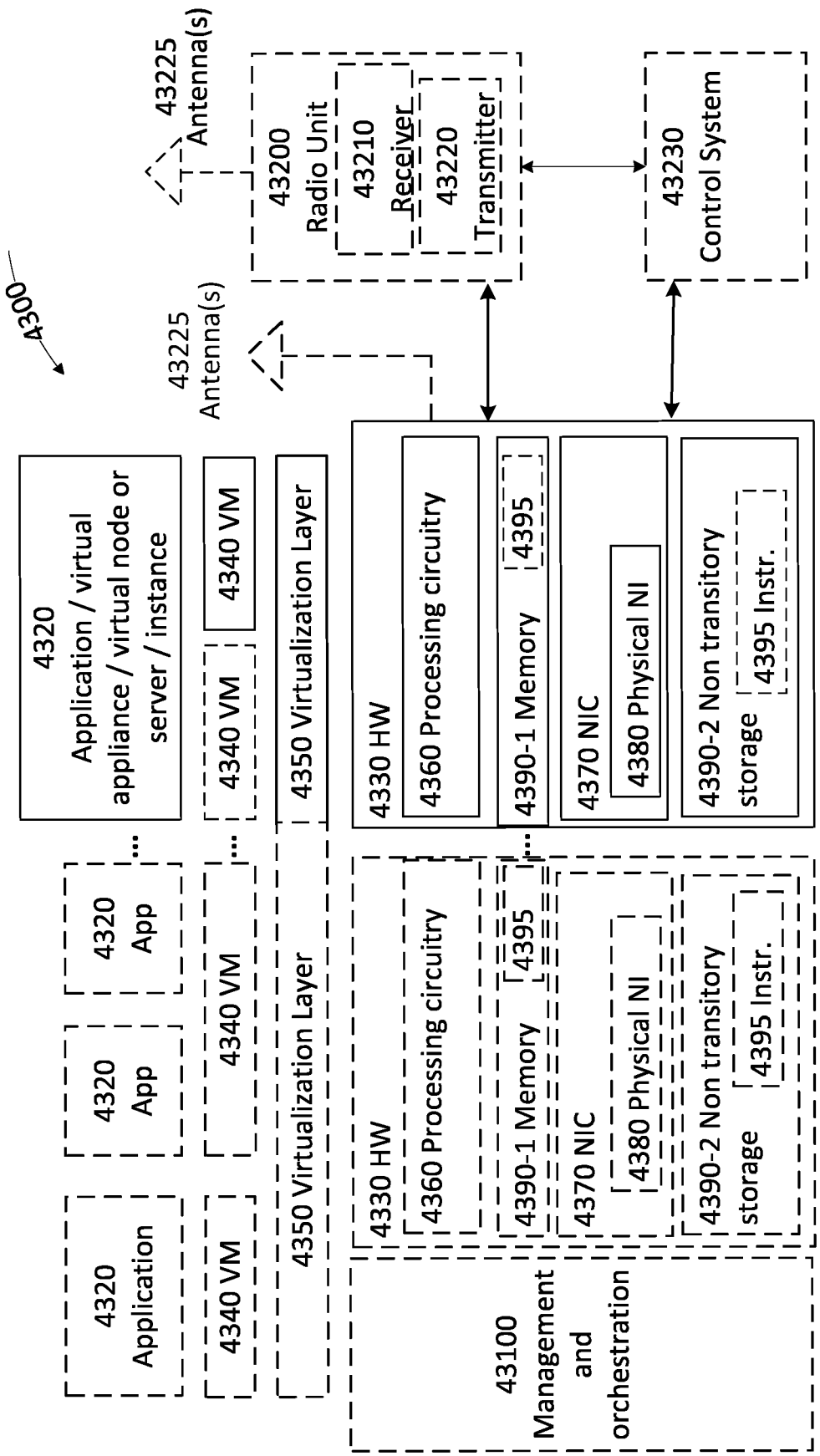
FIG. 12 is a block diagram of a virtualization environment in accordance with some embodiments of the present disclosure.

FIG. 12 illustrates a virtualization environment in accordance with some embodiments.

FIG. 12 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 12, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 12.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be affected with the use of control system 43230 which may alternatively be used for communication between the hardware nodes 4330 and radio units 43200.

Figure 13:
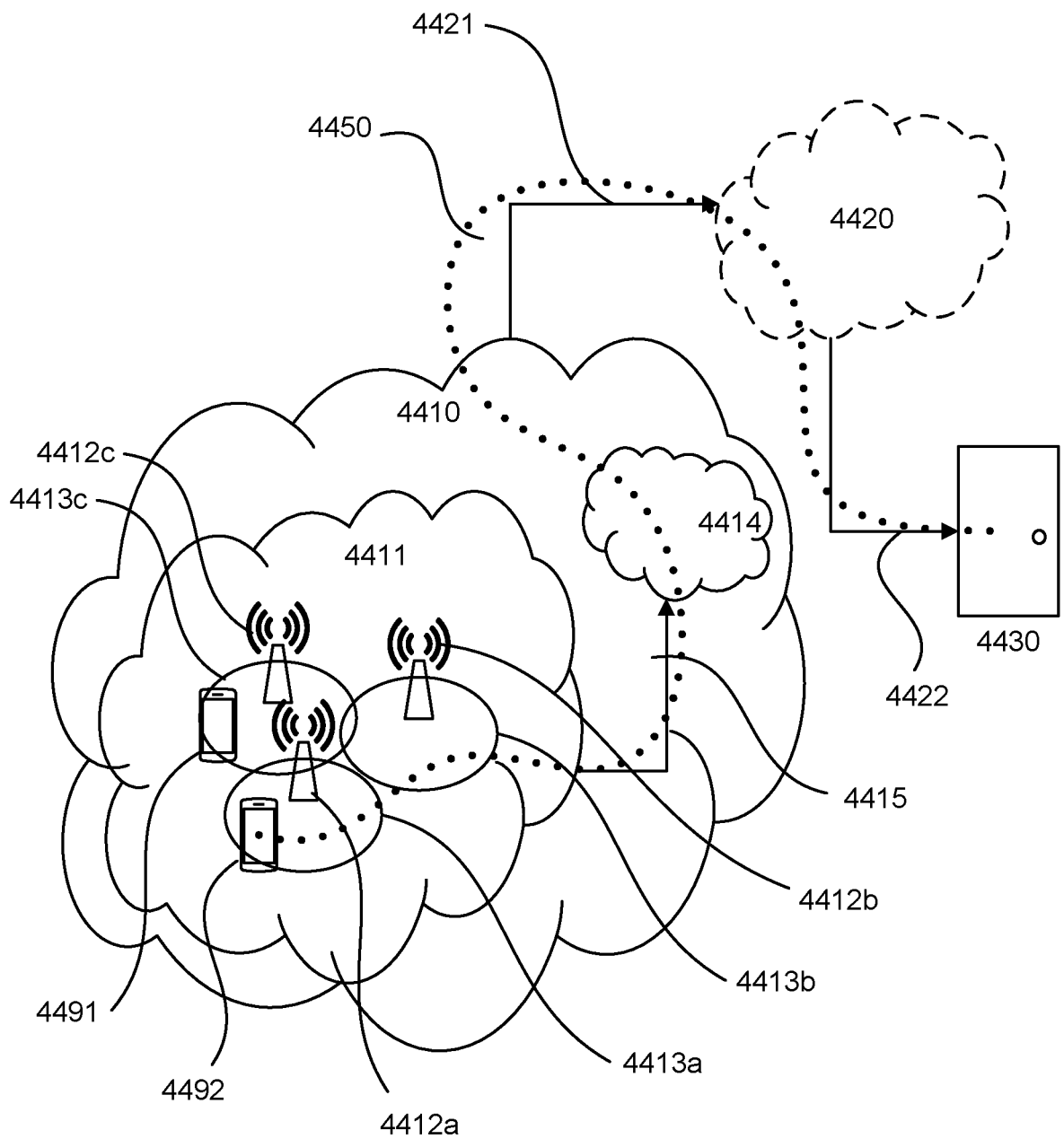
FIG. 13 is a block diagram of a telecommunication network connected via an intermediate network to a host computer in accordance with some embodiments of the present disclosure.

FIG. 13 illustrates a telecommunication network connected via an intermediate network to a host computer in accordance with some embodiments.

With reference to FIG. 13, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 13 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 14:
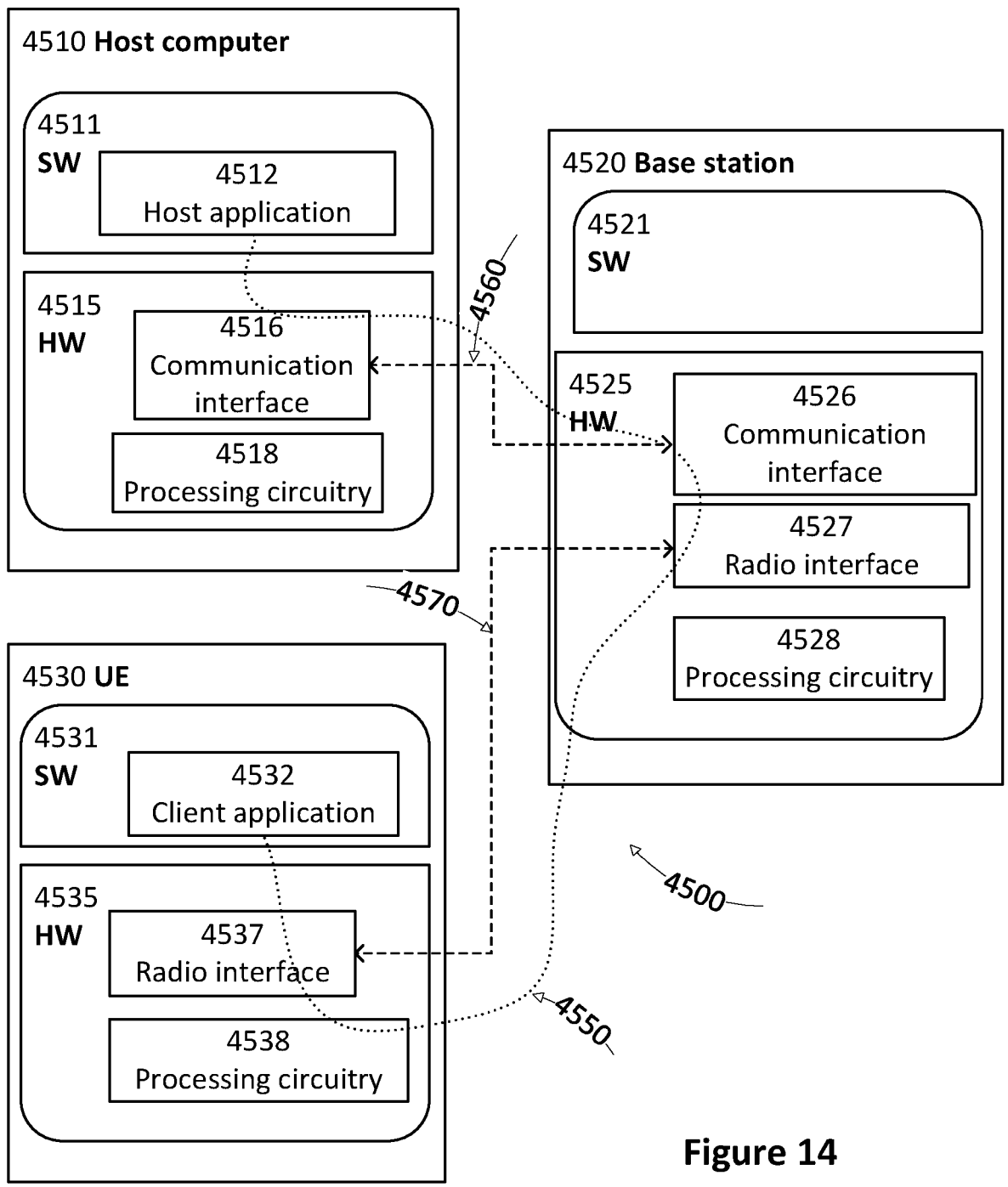
FIG. 14 is a block diagram of a host computer communicating via a base station with a wireless communication device, such as a UE, over a partially wireless connection in accordance with some embodiments of the present disclosure.

FIG. 14 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 14. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 14) served by base station 4520. Communication interface 4526 may be configured to facilitate connection 4560 to host computer 4510. Connection 4560 may be direct or it may pass through a core network (not shown in FIG. 14) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. It's hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 14 may be similar or identical to host computer 4430, one of base stations 4412*a*, 4412*b*, 4412*c* and one of UEs 4491, 4492 of FIG. 13, respectively. This is to say, the inner workings of these entities may be as shown in FIG. 14 and independently, the surrounding network topology may be that of FIG. 13.

In FIG. 14, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 15:
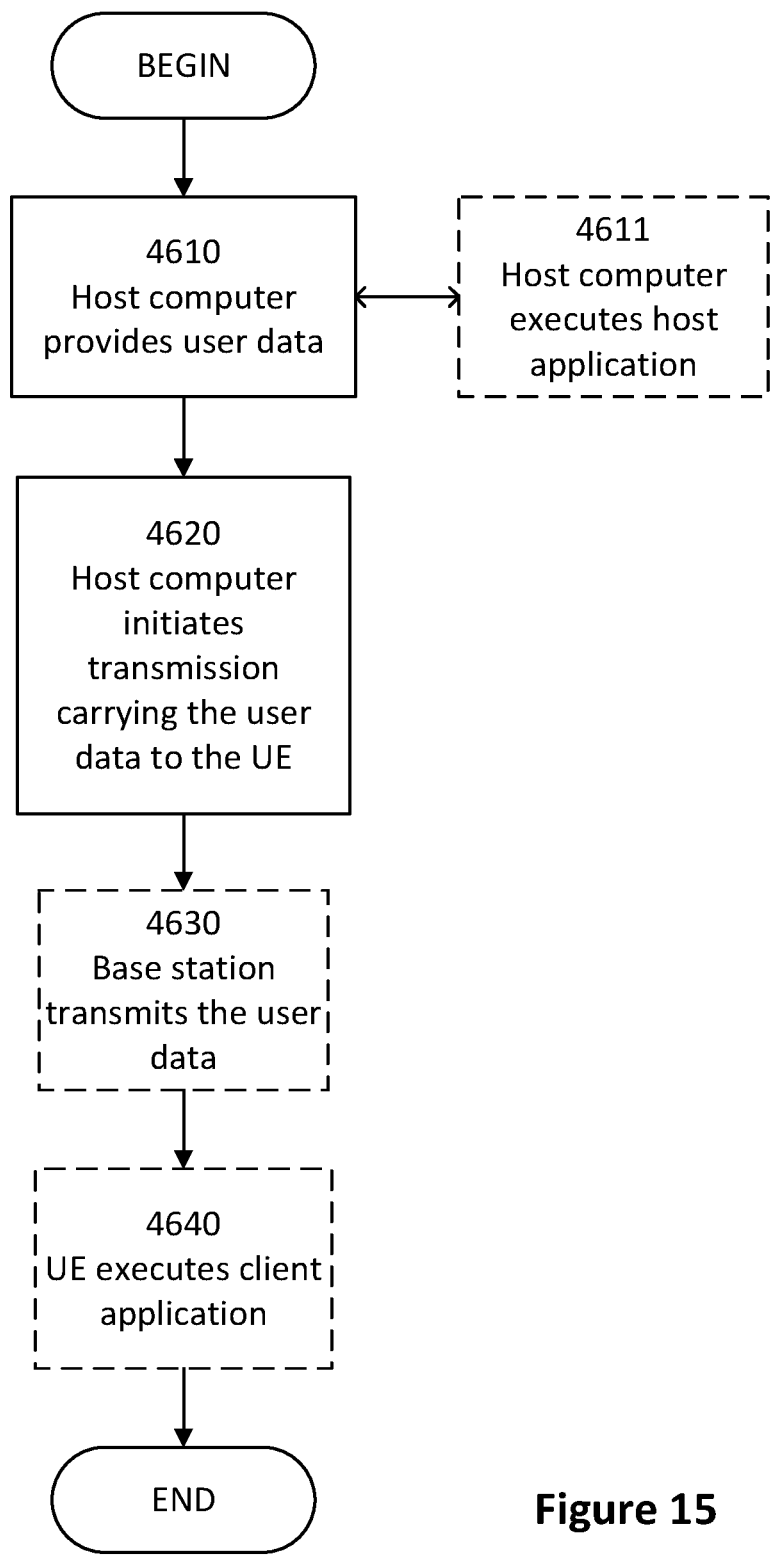
FIG. 15 is a block diagram of methods implemented in a communication system including a host computer, a base station, and a wireless communication device, such as a UE, in accordance with some embodiments of the present disclosure.

FIG. 15 illustrates methods implemented in a communication system including a host computer, a base station and a user equipment in accordance with some embodiments FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 16:
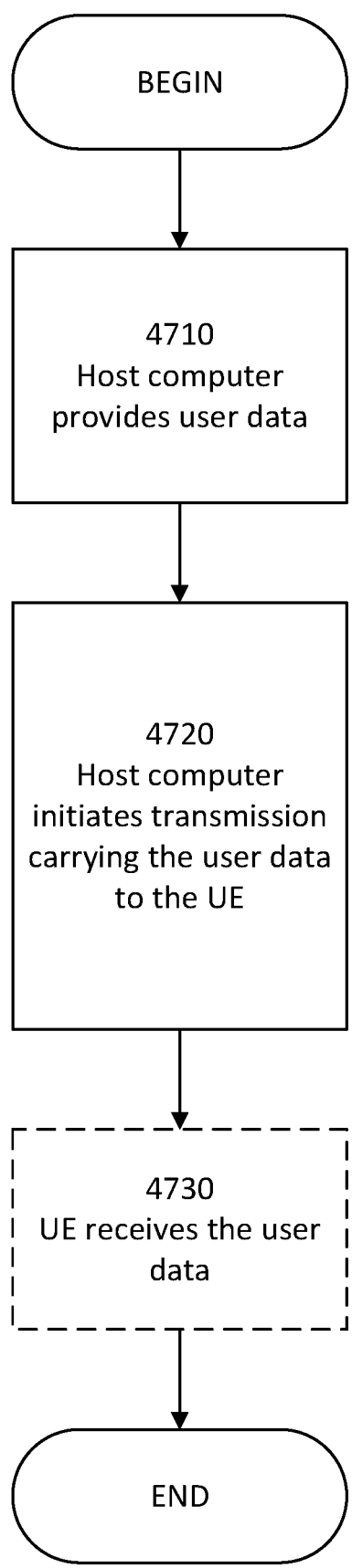
FIG. 16 is a block diagram of methods implemented in a communication system including a host computer, a base station, and a wireless communication device, such as a UE, in accordance with some embodiments of the present disclosure.

FIG. 16 illustrates methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 17:
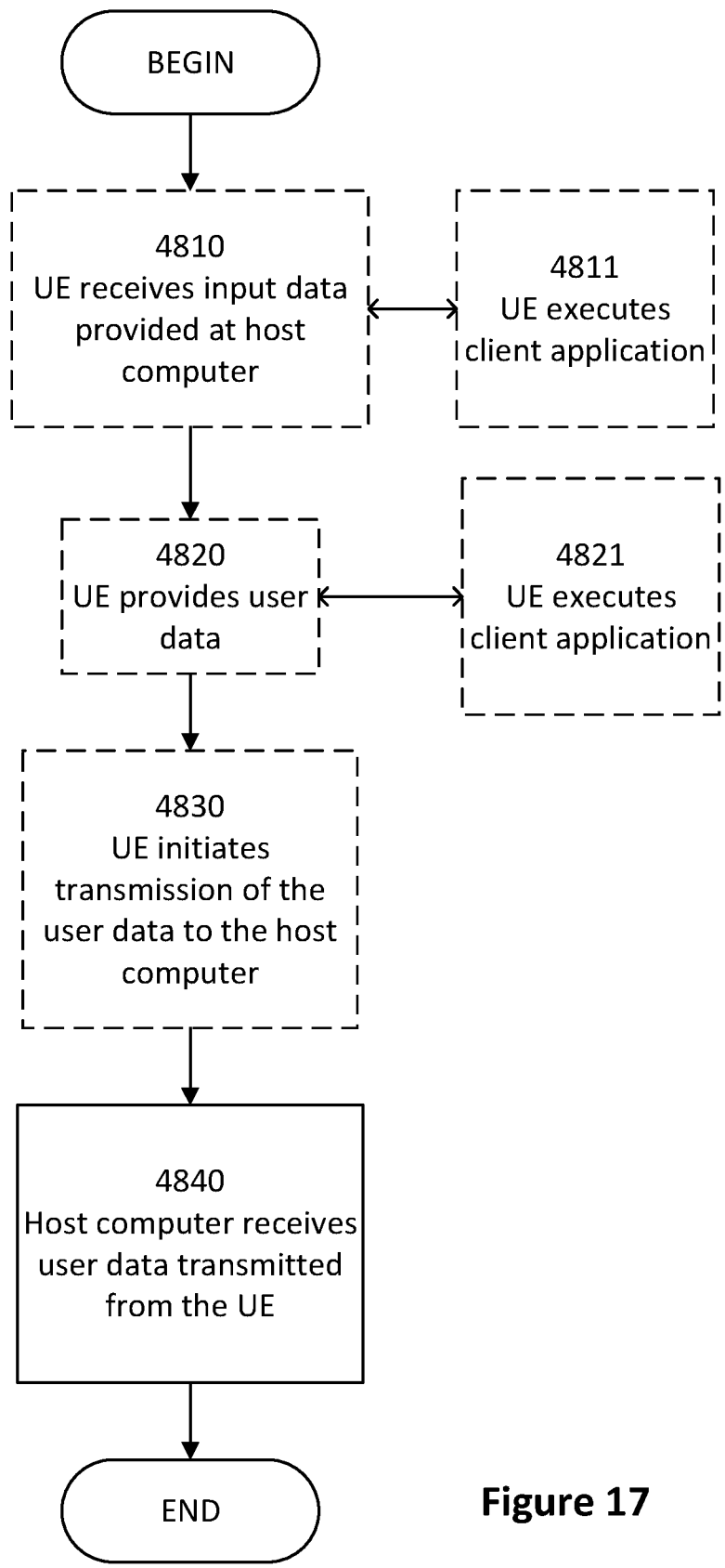
FIG. 17 is a block diagram of methods implemented in a communication system including a host computer, a base station, and a wireless communication device, such as a UE, in accordance with some embodiments of the present disclosure.

FIG. 17 illustrates methods implemented in a communication system including a host computer, a base station and a user equipment in accordance with some embodiments FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 18:
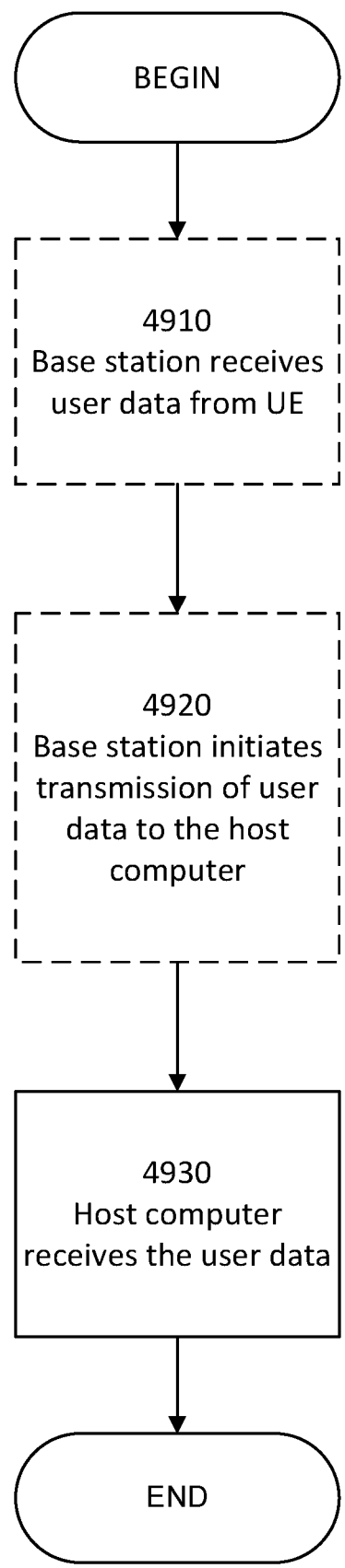
FIG. 18 is a block diagram of methods implemented in a communication system including a host computer, a base station, and a wireless communication device, such as a UE, in accordance with some embodiments of the present disclosure.

FIG. 18 illustrates methods implemented in a communication system including a host computer, a base station and a user equipment in accordance with some embodiments FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A wireless communication device configured for operating in a radio communication network, the wireless communication device comprising:
at least one transceiver circuit; and
at least one processor and at least one memory, the at least one memory containing instructions executable by the at least one processor whereby the wireless communication device is configured to:
obtain information identifying at least one of: 1) how often the wireless communication device requests assistance data be provided by a network node of the radio communication network for positioning by the wireless communication device; and 2) how often the wireless communication device performs positioning; and
send, toward the network node, a request for assistance data, wherein the request contains the information.

2. The wireless communication device of claim 1, wherein the information identifies how often wireless communication device requests assistance data be provided by the network node, wherein the information further identifies a desired assistance data periodicity or identifies a desired assistance data interval within a cycle of the desired assistance data periodicity.

3. The wireless communication device of claim 1, wherein the information identifies how often the wireless communication device performs positioning, wherein the information further identifies a desired periodicity of the positioning by the wireless communication device or identifies a desired interval of the positioning within a cycle of the desired periodicity of the positioning.

4. The wireless communication device of claim 1, wherein the at least one memory contains instructions executable by the at least one processor whereby the wireless communication device is further configured to send, toward the network node, positioning capability information identifying what positioning capabilities are supported by the wireless communication device.

5. The wireless communication device of claim 4, wherein the positioning capability information identifies at least one of: 1) what positioning measurements the wireless communication device supports; 2) what assistance data the wireless communication device supports for positioning; 3) what positioning modes the wireless communication device supports; 4) what positioning methods the wireless communication device supports; 5) what positioning configuration features the wireless communication device supports; 6) what positioning configuration measurements the wireless communication device supports; and 7) what location information aspects the wireless communication device supports.

6. The wireless communication device of claim 4, wherein the at least one memory contains instructions executable by the at least one processor whereby the wireless communication device is configured to send the positioning capability information to a serving node within a radio access node or to an Access and Mobility management Function.

7. The wireless communication device of claim 4, wherein the positioning capability information identifies at least one of: 1) how frequent the wireless communication device is capable of receiving assistance data; 2) how frequent the wireless communication device is capable of determining its position with network assistance; and 3) how often the wireless communication device is capable of reporting positioning measurements.

8. The wireless communication device of claim 1, wherein the at least one memory contains instructions executable by the at least one processor whereby the wireless communication device is further configured to obtain assistance data for positioning from the network node.

9. The wireless communication device of claim 8, wherein the at least one memory contains instructions executable by the at least one processor whereby the wireless communication device is configured to obtain the assistance data at a periodicity or an interval within a cycle of the periodicity that is known to the wireless communication device based on the information sent toward the network node identifying a desired assistance data periodicity or a desired assistance data interval within a cycle of the periodicity at which the wireless communication device requests assistance data be provided by the network node for the positioning by the wireless communication device.

10. The wireless communication device of claim 8, wherein the at least one memory contains instructions executable by the at least one processor whereby the wireless communication device is configured to obtain the assistance data at a periodicity or an interval within a cycle of the periodicity that is not based on the information sent in the request for assistance data toward the network node.

11. The wireless communication device of claim 8, wherein the at least one memory contains instructions executable by the at least one processor whereby the wireless communication device is configured to obtain the assistance data at a periodicity or an interval within a cycle of the periodicity that is known to the wireless communication device based on the information sent toward the network node identifying a desired periodicity of the positioning by the wireless communication device or a desired interval of the positioning by the wireless communication device within the desired periodicity of the positioning.

12. The wireless communication device of claim 1, wherein the at least one memory contains instructions executable by the at least one processor whereby the wireless communication device is configured to obtain a management reporting log configuration, wherein the management reporting log configuration identifies a logging periodicity or a logging interval within a cycle of the logging periodicity at which the wireless communication device is to log position.

13. The wireless communication device of claim 12, wherein the at least one memory contains instructions executable by the at least one processor whereby the wireless communication device is configured to:
when the logging periodicity or the logging interval does not match a periodicity or interval of assistance data obtained from the network node or does not match a periodicity or interval at which the wireless communication device performs positioning, and when the logging interval is larger than an assistance interval used by the wireless communication device for positioning, request the network node to:
provide more often transmission of assistance data at a newly requested assistance interval; or
support a different logging periodicity.

14. The wireless communication device of claim 1, wherein the at least one memory contains instructions executable by the at least one processor whereby the wireless communication device is further configured to perform management report logging of determined positioning at a logging interval.

15. The wireless communication device of claim 14, wherein:
when the logging interval is longer than or equal to a desired interval for the wireless communication device to perform positioning, the management report logging is performed at each instance of the logging interval, wherein the logging interval is defined in a management reporting log configuration obtained by the wireless communication device; or
when the logging interval is shorter than a desired interval for the wireless communication device to perform positioning, the management report logging logs a most recently determined positioning information at each instance of the logging interval, wherein the logging interval is defined in a management reporting log configuration obtained by the wireless communication device.

16. The wireless communication device of claim 14, wherein:
when the logging interval is longer than or equal to an interval of positioning assistance information obtained by the wireless communication device, the management report logging is performed at each instance of the logging interval, wherein the logging interval is defined in a management reporting log configuration obtained by the wireless communication device; or
when the logging interval is shorter than an interval of positioning assistance information obtained by the wireless communication device, the management report logging logs a most recently determined positioning information at each instance of the logging interval, wherein the logging interval is defined in a management reporting log configuration obtained by the wireless communication device.

17. The wireless communication device of claim 14, wherein the at least one memory contains instructions executable by the at least one processor whereby the wireless communication device is further configured to adapt the logging interval based on a minimum of: 1) the periodicity at which the wireless communication device requests assistance data be provided by the network node; and 2) how often the wireless communication device performs positioning.

18. A serving node configured to communicate with wireless communication devices and a network node of a radio communication network, the serving node comprising:
at least one network interface; and
at least one processor and at least one memory, the at least one memory containing instructions executable by the at least one processor whereby the serving node is configured to request the network node to provide assistance information that identifies wireless communication devices that are configured to use assistance data from the network node for positioning and/or identifies wireless communication devices that have requested assistance data from the network node for positioning.

19. A network node configured to communicate with a serving node of a radio communication network, the network node comprising:
at least one network interface; and
at least one processor and at least one memory, the at least one memory containing instructions executable by the at least one processor whereby the network node is configured to:
receive a request from the serving node to identify wireless communication devices that are configured to use assistance data from the network node for positioning and/or to identify wireless communication devices that have requested assistance data from the network node for positioning; and send a list of the identified wireless communication devices as content of the assistance information to the serving node.

20. A method of operating a wireless communication device of a radio communication network, the method comprising:

obtaining information identifying at least one of: 1) how often the wireless communication device requests assistance data be provided by a network node of the radio communication network for positioning by the wireless communication device; and 2) how often the wireless communication device performs positioning; and sending a request for assistance data containing the information toward the network node.

* * * * *